(12) United States Patent
Luo et al.

(10) Patent No.: US 9,005,476 B2
(45) Date of Patent: Apr. 14, 2015

(54) POLYARYLENE SULFIDE/LIQUID CRYSTAL POLYMER ALLOY AND COMPOSITIONS INCLUDING SAME

(71) Applicant: Ticona LLC, Florence, KY (US)

(72) Inventors: Rong Luo, Florence, KY (US); Xinyu Zhao, Cincinnati, OH (US); Paul C. Yung, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 168 days.

(21) Appl. No.: 13/621,867

(22) Filed: Sep. 18, 2012

(65) Prior Publication Data

US 2013/0069001 A1  Mar. 21, 2013

Related U.S. Application Data

(60) Provisional application No. 61/536,735, filed on Sep. 20, 2011, provisional application No. 61/548,534, filed on Oct. 18, 2011, provisional application No. 61/550,631, filed on Oct. 24, 2011.

(51) Int. Cl.
| | |
|---|---|
| C09K 19/38 | (2006.01) |
| C09K 19/54 | (2006.01) |
| C08G 75/02 | (2006.01) |
| C08L 81/02 | (2006.01) |

(52) U.S. Cl.
CPC ..................................... C08L 81/02 (2013.01)

(58) Field of Classification Search
USPC ............ 252/299.01, 299.5; 524/609; 525/150
See application file for complete search history.

(56) References Cited

U.S. PATENT DOCUMENTS

| | | | |
|---|---|---|---|
| 3,725,362 | A | 4/1973 | Walker |
| 3,729,404 | A | 4/1973 | Morgan |
| 4,021,596 | A | 5/1977 | Bailey |
| 4,119,617 | A | 10/1978 | Hanyuda et al. |

(Continued)

FOREIGN PATENT DOCUMENTS

| | | |
|---|---|---|
| CN | 101768358 | 7/2010 |
| CN | 102140233 | 8/2011 |

(Continued)

OTHER PUBLICATIONS

Gopakumar et al., "In situ compatibilisation of poly(phenylene sulphide)/wholly aromatic thermotropic liquid crystalline polymer blends by reactive extrusion:morphology, thermal and mechanical properties", Polymer 40 (1999) 357-364.*

(Continued)

Primary Examiner — Shean C Wu
(74) Attorney, Agent, or Firm — Dority & Manning, P.A.

(57) ABSTRACT

Polyarylene sulfide/liquid crystal polymer alloys are described as are methods of forming the polyarylene sulfide/liquid crystal polymer alloys. The polyarylene sulfide/liquid crystal polymer alloys are formed according to a melt processing method that includes melt processing a polyarylene sulfide with a reactively functionalized disulfide compound and a liquid crystal polymer in a one or two step process. The reactively functionalized disulfide compound is added in a stoichiometric amount to react with a portion of the polyarylene sulfide. The melt processing forms a polyarylene sulfide/liquid crystal polymer copolymer that is a compatibilizer in the alloy. The polyarylene sulfide/liquid crystal polymer alloys may provide low chlorine content products having excellent strength characteristics.

28 Claims, 8 Drawing Sheets

(56) References Cited

U.S. PATENT DOCUMENTS

| | | |
|---|---|---|
| 4,276,397 A | 6/1981 | Froix |
| 4,605,713 A | 8/1986 | Heitz et al. |
| 4,678,831 A | 7/1987 | Kawabata et al. |
| 4,760,128 A | 7/1988 | Ebert et al. |
| 4,769,424 A | 9/1988 | Takekoshi et al. |
| 4,820,801 A | 4/1989 | Inoue et al. |
| 4,889,893 A | 12/1989 | Kobayashi et al. |
| 4,935,473 A | 6/1990 | Fukuda et al. |
| 5,015,703 A | 5/1991 | Takekoshi et al. |
| 5,015,704 A | 5/1991 | Takekoshi et al. |
| 5,047,465 A | 9/1991 | Auerbach |
| 5,057,264 A | 10/1991 | Bier et al. |
| 5,068,312 A | 11/1991 | Dorf et al. |
| 5,070,127 A | 12/1991 | Auerbach |
| 5,122,578 A | 6/1992 | Han et al. |
| 5,151,458 A | 9/1992 | Heinz et al. |
| 5,182,334 A | 1/1993 | Chen, Sr. et al. |
| 5,218,043 A | 6/1993 | Kubota et al. |
| 5,227,427 A | 7/1993 | Seizawa et al. |
| 5,276,107 A | 1/1994 | Kim et al. |
| 5,384,196 A | 1/1995 | Inoue et al. |
| 5,418,281 A | 5/1995 | Yung et al. |
| 5,436,300 A | 7/1995 | Kashiwadate et al. |
| 5,488,084 A | 1/1996 | Kadoi et al. |
| 5,504,141 A | 4/1996 | Collard et al. |
| 5,541,243 A | 7/1996 | Ohmura et al. |
| 5,652,287 A | 7/1997 | Sullivan et al. |
| 5,654,383 A | 8/1997 | Kohler et al. |
| 5,679,284 A | 10/1997 | Kurita |
| 5,780,583 A | 7/1998 | Lubowitz et al. |
| 5,959,071 A | 9/1999 | DeMoss et al. |
| 5,981,007 A | 11/1999 | Rubin et al. |
| 5,997,765 A | 12/1999 | Furuta et al. |
| 6,001,934 A | 12/1999 | Yamanaka et al. |
| 6,010,760 A | 1/2000 | Miyazaki et al. |
| 6,080,822 A | 6/2000 | Haubs et al. |
| 6,117,950 A | 9/2000 | Yamao et al. |
| 6,130,292 A | 10/2000 | Harwood et al. |
| 6,201,098 B1 | 3/2001 | Haubs et al. |
| 6,221,962 B1* | 4/2001 | Heino et al. ............ 525/133 |
| 6,280,668 B1 | 8/2001 | Saito et al. |
| 6,317,314 B1 | 11/2001 | Kung et al. |
| 6,339,400 B1 | 1/2002 | Flint et al. |
| 6,476,106 B1 | 11/2002 | Murakami et al. |
| 6,608,136 B1 | 8/2003 | Dean et al. |
| 6,645,623 B2 | 11/2003 | Dean et al. |
| 6,699,946 B1 | 3/2004 | Lambla et al. |
| 6,730,378 B2 | 5/2004 | Matsuoka et al. |
| 6,793,847 B2 | 9/2004 | Maeda et al. |
| 6,830,792 B1 | 12/2004 | Matsuoka et al. |
| 6,875,517 B2 | 4/2005 | Bosshammer et al. |
| 6,889,719 B2 | 5/2005 | Watanabe et al. |
| 6,900,272 B2 | 5/2005 | Matsuoka et al. |
| 6,960,628 B2 | 11/2005 | Matsuoka et al. |
| 7,115,312 B2 | 10/2006 | Matsuoka et al. |
| 7,118,691 B2 | 10/2006 | Elkovitch et al. |
| 7,169,887 B2 | 1/2007 | Papke |
| 7,235,612 B2 | 6/2007 | Kobayashi et al. |
| 7,271,769 B2 | 9/2007 | Asano et al. |
| 7,301,783 B2 | 11/2007 | Homer et al. |
| 7,303,822 B1 | 12/2007 | Matsuoka et al. |
| 7,385,806 B2 | 6/2008 | Liao |
| 7,462,672 B2 | 12/2008 | Kobayashi et al. |
| 7,486,243 B2 | 2/2009 | Wulff et al. |
| 7,486,517 B2 | 2/2009 | Aapro et al. |
| 7,518,568 B2 | 4/2009 | Tracy et al. |
| 7,553,925 B2 | 6/2009 | Bojkova |
| 7,608,666 B2 | 10/2009 | Matsuoka et al. |
| 7,960,473 B2 | 6/2011 | Kobayashi et al. |
| 7,974,660 B2 | 7/2011 | Hsu et al. |
| 7,989,079 B2 | 8/2011 | Lee et al. |
| 8,005,429 B2 | 8/2011 | Conway et al. |
| 8,026,309 B2 | 9/2011 | Halahmi et al. |
| 8,044,142 B2 | 10/2011 | Akiyama et al. |
| 8,076,423 B2 | 12/2011 | Ishio et al. |
| 8,152,071 B2 | 4/2012 | Doherty et al. |
| 8,168,732 B2 | 5/2012 | Ajbani et al. |
| 8,258,242 B2 | 9/2012 | Hiroi et al. |
| 8,338,547 B2 | 12/2012 | Takahashi et al. |
| 8,367,210 B2 | 2/2013 | Naritomi et al. |
| 8,426,552 B2 | 4/2013 | Hinokimori et al. |
| 8,462,054 B2 | 6/2013 | Yang et al. |
| 2003/0050091 A1 | 3/2003 | Tsai et al. |
| 2004/0257283 A1 | 12/2004 | Asano et al. |
| 2005/0104190 A1 | 5/2005 | Mithal et al. |
| 2006/0257624 A1 | 11/2006 | Naritomi et al. |
| 2009/0011163 A1 | 1/2009 | Ajbani |
| 2009/0267266 A1 | 10/2009 | Lee et al. |
| 2009/0280347 A1 | 11/2009 | Yu |
| 2010/0048777 A1 | 2/2010 | Kodama et al. |
| 2010/0249342 A1 | 9/2010 | Unohara et al. |
| 2011/0037193 A1 | 2/2011 | Takada et al. |
| 2011/0089792 A1 | 4/2011 | Casebolt et al. |
| 2011/0090630 A1 | 4/2011 | Bergerone et al. |
| 2011/0134012 A1 | 6/2011 | Yang et al. |
| 2011/0169700 A1 | 7/2011 | Degner et al. |
| 2012/0065361 A1 | 3/2012 | Konno et al. |
| 2012/0237714 A1 | 9/2012 | Nishikawa et al. |
| 2013/0035440 A1 | 2/2013 | Nishikawa et al. |
| 2013/0059976 A1 | 3/2013 | Matsuo et al. |
| 2013/0071638 A1 | 3/2013 | Luo et al. |
| 2013/0072629 A1 | 3/2013 | Luo et al. |
| 2013/0072630 A1 | 3/2013 | Luo et al. |
| 2013/0225771 A1 | 8/2013 | Kanomata et al. |
| 2013/0249357 A1 | 9/2013 | Luo et al. |

FOREIGN PATENT DOCUMENTS

| | | |
|---|---|---|
| CN | 102181156 | 9/2011 |
| CN | 102532898 | 7/2012 |
| DE | 3813919 | 11/1989 |
| DE | 4138906 | 6/1993 |
| EP | 0405135 | 1/1991 |
| EP | 0432561 | 6/1991 |
| EP | 0546185 | 6/1993 |
| EP | 0549977 | 7/1993 |
| EP | 0568945 | 11/1993 |
| JP | 03-231969 A | 10/1991 |
| JP | 05-086266 A | 4/1993 |
| JP | 05-170907 A | 7/1993 |
| JP | 05-230371 A | 9/1993 |
| JP | 08-151518 A | 6/1996 |
| JP | 11-140315 A | 5/1999 |
| JP | 2980054 B | 11/1999 |
| JP | 3034335 B | 4/2000 |
| JP | 2001-172501 A | 6/2001 |
| JP | 3227729 B | 11/2001 |
| JP | 2004-182754 A | 7/2004 |
| JP | 3579957 B | 10/2004 |
| JP | 3601090 B | 12/2004 |
| JP | 3637715 B | 4/2005 |
| JP | 3800783 B | 7/2006 |
| JP | 2006-316207 A | 11/2006 |
| JP | 3867549 B | 1/2007 |
| JP | 2007-197714 A | 8/2007 |
| JP | 2007-277292 A | 10/2007 |
| JP | 4038607 B | 1/2008 |
| JP | 4129674 B | 8/2008 |
| JP | 4196647 B | 12/2008 |
| JP | 2009-256480 A | 11/2009 |
| JP | 2009-263635 A | 11/2009 |
| JP | 2010-053356 A | 3/2010 |
| JP | 2010-084125 A | 4/2010 |
| JP | 4495261 B | 6/2010 |
| JP | 2010-195874 A | 9/2010 |
| JP | 4552315 B | 9/2010 |
| JP | 4943399 B | 5/2012 |

(56) References Cited

FOREIGN PATENT DOCUMENTS

JP          5029881 B    9/2012
WO    WO 2009/033349   3/2009

OTHER PUBLICATIONS

Mar. 6, 2013 International Search Report and Written Opinion of application PCT/US2012/055857.

* cited by examiner

POLYARYLENE SULFIDE/LIQUID CRYSTAL POLYMER ALLOY AND COMPOSITIONS INCLUDING SAME

CROSS REFERENCE TO RELATED APPLICATIONS

The present application claims filing benefit of U.S. Provisional Patent Application Ser. No. 61/536,735 having a filing date of Sep. 20, 2011, of U.S. Provisional Patent Application Ser. No. 61/548,534 having a filing date of Oct. 18, 2011, and of U.S. Provisional Patent Application Ser. No. 61/550,631 having a filing date of Oct. 24, 2011, all of which are incorporated herein by reference in their entirety.

BACKGROUND OF THE INVENTION

Polyarylene sulfides and aromatic polyesters are high-performance polymers that may withstand high thermal, chemical, and mechanical stresses and are beneficially utilized in a wide variety of applications.

Each of these polymers can provide advantages to a product composition. For example, polyarylene sulfides have excellent flame resistance, chemical resistance, and high weidline strength. Aromatic polyesters, also referred to as liquid crystal polymers, have good flowability and processibility and can exhibit anisotropic mechanical properties.

In view of the above, those skilled in the art have attempted to combine polyarylene sulfides with liquid crystal polymers in polymer alloys. Unfortunately, liquid crystal polymers are not entirely compatible with polyarylene sulfides. For instance, thermal degradation of the polymers can occur when the polymers are heated together during melt processing, for instance during molding of a composition including the alloy. This thermal instability can produce deposits on the mold surface. Moreover, deposits accumulated on the mold surface can stick to the surface of a molded part. This can cause serious problems including formation of defective parts, particularly when considering parts that are sensitive to contamination, such as connectors for electronic applications. Deposition problems can also cause significant loss in productivity, as deposition can require a continuous molding process to be stopped to clean the mold. In addition to problems associated with deposition due to immiscibility, products incorporating a polyarylene sulfide/liquid crystal polymer alloy have often not obtained desired surface appearance, and particularly desired levels of surface glossiness.

Compatibilizers have been developed to be included in a polyarylene sulfide/liquid crystal polymer alloy and improve stability of the alloy. While use of compatibilizers has improved the alloys, compatibilizers to date have been formed in a separate process and then added with other additives during formation of a composition that includes the polyarylene sulfide/liquid crystal polymer alloy. Separate formation steps for preparation and addition of a compatibilizer can add significant costs to a composite formation process.

Other problems exist with polyarylene sulfide/liquid crystal polymer alloys. For instance, polyarylene sulfides are generally formed via polymerization of p-dichlorobenzene with an alkali metal sulfide or an alkali metal hydrosulfide, forming polymers that include chlorine at the terminal groups. With low halogen-content polymeric materials becoming increasingly desired due to environmental concerns, attempts have been made to produce low chlorine content polyarylene sulfides. In general, this has involved utilizing higher molecular weight polyarylene sulfides in the compositions, as higher molecular weight polyarylene sulfides will include fewer terminal groups and hence have lower chlorine content.

Unfortunately, high molecular weight polyarylene sulfides have high melt viscosity, and this presents processibility issues that may complicate processing techniques, even when the polyarylene sulfide is combined with a liquid crystal polymer that can exhibit good processibility characteristics in an alloy. This problem may be aggravated with the inclusion in the composition of fillers that may improve desirable characteristics of the formed composites but also further increase melt viscosity of the composition.

In view of the above, a need currently exists for improved polyarylene sulfide/liquid crystal polymer alloys and compositions including the alloys. In addition, a facile, low cost method of forming a polyarylene sulfide/liquid crystal alloy would be of great benefit.

SUMMARY OF THE INVENTION

According to one embodiment, disclosed is a polyarylene sulfide/liquid crystal polymer alloy. An alloy can include a polyarylene sulfide, a liquid crystal polymer, and a compatibilizer. The compatibilizer can be a copolymer that is formed in situ in conjunction with the formation of the polyarylene sulfide/liquid crystal polymer alloy and as such the compatibilizer can include a first unit of the polyarylene sulfide and a second unit of the liquid crystal polymer that are copolymerized with one another.

Also disclosed are compositions including a polyarylene sulfide/liquid crystal polymer alloy and one or more additives as well as products including a polyarylene sulfide/liquid crystal polymer alloy such as, without limitation, electrical connectors or overmoldings.

Also disclosed is a method of forming a polyarylene sulfide/liquid crystal polymer alloy. A method can include, for instance, melt processing a polyarylene sulfide with a reactively functionalized disulfide compound comprising reactive moieties. The reactively functionalized disulfide compound can be present in the melt processing in a stoichiometric amount to react with only a portion of the polyarylene sulfide so as to form a polyarylene sulfide endcapped with the reactive moieties of the reactively functionalized disulfide compound. A method can also include combining a liquid crystal polymer with the polyarylene sulfide and forming a polyarylene sulfide/liquid crystal polymer copolymer that is a compatibilizer in the polyarylene sulfide/liquid crystal polymer alloy. The polyarylene sulfide/liquid crystal polymer alloy that is formed can include the polyarylene sulfide that does not react with the reactively functionalized disulfide compound, the liquid crystal polymer, and the compatibilizer.

BRIEF DESCRIPTION OF THE FIGURES

The present disclosure may be better understood with reference to the following figures.

DETAILED DESCRIPTION

Figure 1:
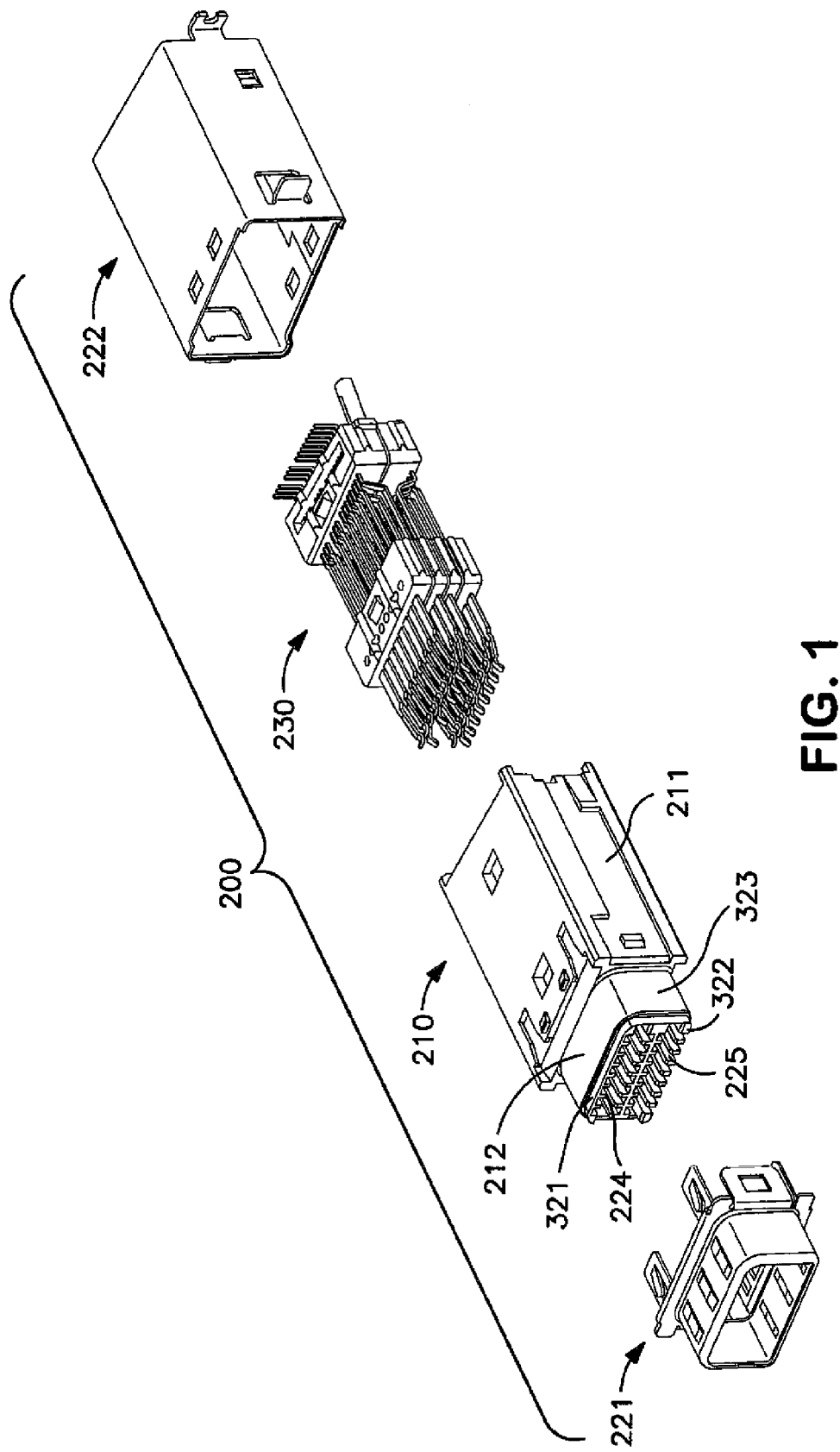
FIG. 1 illustrates an exploded view of an electrical connector as may incorporate a polyarylene sulfide/liquid crystal polymer alloy as described herein.

The present disclosure is generally directed to polyarylene sulfide/liquid crystal polymer alloys, compositions including a polyarylene sulfide/liquid crystal polymer alloy and methods for forming a polyarylene sulfide/liquid crystal polymer alloy.

In general, a polyarylene sulfide/liquid crystal polymer alloy can be formed according to a process that includes combining a reactively functionalized disulfide compound and a polyarylene sulfide with a liquid crystal polymer. More specifically, and without wishing to be bound to any particular theory, it is believed that during melt processing, the reactively functionalized disulfide compound can react with the polyarylene sulfide according to a hemolytic reaction, resulting in chain scission of the polyarylene sulfide and end capping of the polyarylene sulfide with reactive moieties of the reactively functionalized disulfide. The end capped reactive polyarylene sulfide can then react with the liquid crystal polymer according to a transesterification reaction, the product of which is a polyarylene sulfide/liquid crystal polymer copolymer that can be formed in situ during formation of the polyarylene sulfide/liquid crystal polymer alloy and is a compatibilizer in the polyarylene sulfide/liquid crystal polymer alloy. In general, the reactively functionalized disulfide compound can be added to a melt processing process in a stoichiometric amount so as to react with only a portion of the polyarylene sulfide, and the polyarylene sulfide/liquid crystal polymer alloy can therefore include the copolymer compatibilizer as well as polyarylene sulfide and liquid crystal polymer that have not been copolymerized with each other. In one embodiment, the compatibilizer can be formed during melt processing of the polyarylene sulfide with the liquid crystal polymer, and the polyarylene sulfide/liquid crystal polymer alloy can be formed in a relatively simple one or two-step melt processing process.

The in situ formation of the compatibilizer during formation of the polyarylene sulfide/liquid crystal polymer alloy can provide a simple route to providing a compatibilizer that is specifically designed for any combination of polyarylene sulfide(s) and liquid crystal polymer(s). More specifically, the in situ formation technique automatically ensures that the compatibilizer will include units of the polyarylene sulfide and units of the liquid crystal polymer copolymerized together and that are to be included in the polyarylene sulfide/liquid crystal polymer alloy. In previously known techniques, it was necessary to know which specific polyarylene sulfide and which specific liquid crystal polymer were to be combined in an alloy, and then separately form a compatibilizer specific to those materials. In such a system, if one of the polymers of the alloy is changed, the formation of the compatibilizer will also need to be changed in order to ideally match the compatibilizer with the polymers of the alloy. In the disclosed methods, this separate step is not required, as the in situ compatibilizers formation necessarily forms a polyarylene sulfide/liquid crystal polymer copolymer compatibilizer that includes as copolymer units segments of the specific polyarylene sulfide and liquid crystal polymer added to the process.

In one embodiment, a melt processing technique that is used to form a polyarylene sulfide/liquid crystal polymer alloy can also include addition of other additives so as to form a composition including a polyarylene sulfide/liquid crystal polymer alloy in a single melt processing process.

It is understood that combination of the reactively functionalized disulfide compound with the polyarylene sulfide during melt processing and formation of the polyarylene sulfide/liquid crystal polymer alloy can lower the overall melt viscosity of the polyarylene sulfide/liquid crystal polymer alloy. As such, a composition including a polyarylene sulfide/liquid crystal polymer alloy can have a relatively low melt viscosity that can improve processibility of the composition. For instance, a composition including a polyarylene sulfide/liquid crystal polymer alloy can have a melt viscosity of less than about 1500 poise, less than about 1000 poise, less than about 500 poise, or less than about 400 poise as determined in accordance with ISO Test No. 11443 at a shear rate of 1200 $s^{-1}$ and at a temperature of 310° C.

In one embodiment, the polyarylene sulfide can be a high molecular weight, low chlorine content polyarylene sulfide, and the resulting polyarylene sulfide/liquid crystal polymer alloy as well as a composition including the polyarylene sulfide/liquid crystal polymer alloy can not only exhibit a relatively low melt viscosity and resulting good processibility, but can also have a low chlorine content. For instance, a polyarylene sulfide/liquid crystal polymer alloy and/or a composition including the polyarylene sulfide/liquid crystal polymer alloy can have a chlorine content of less than about 1000 ppm, less than about 900 ppm, less than about 600 ppm, or less than about 400 ppm. In one embodiment, a composition including the polyarylene sulfide/liquid crystal polymer alloy can be halogen free according to the International Electrochemical Commission standard 61249-2-21.

In addition, the melt processed polyarylene sulfide composition can be a homogeneous composition and can exhibit excellent mechanical characteristics. Without wishing to be bound by any particular theory, it is believed that the in situ formation process of the compatibilizer can lead to formation of a polyarylene sulfide/liquid crystal polymer alloy with improved miscibility and this improved miscibility can lead to improved mechanical characteristics of a composition that includes the polyarylene sulfide/liquid crystal polymer alloy.

By way of example, a composition including a polyarylene sulfide/liquid crystal polymer alloy can have a weldline tensile strength of greater than about 30 MPa, greater than about 32 MPa, or greater than about 35 MPa, as measured according to ISO Test No. 527 (technically equivalent to ASTM D638) at a testing temperature of 23° C. and at a testing speed of 5 mm/min. In one embodiment, the weld line strength of a composition including a polyarylene sulfide/liquid crystal polymer alloy can improve by more than about 30%, or more than about 35% as compared to a similar composition that does not include the compatibilizer and is merely a polyarylene sulfide/liquid crystal polymer blend.

A composition including a polyarylene sulfide/liquid crystal polymer alloy may have desirable appearance. For instance, a composition including a polyarylene/liquid crystal polymer alloy may have a surface glossiness of greater than about 60, greater than about 65, or greater than about 70, as determined by use of a gloss meter.

A composition including a polyarylene sulfide/liquid crystal polymer alloy may have a good Izod unnotched impact strength (Unnotched Izod) as measured according to ISO Test No. 180/1 U as well as a good Izod notched impact strength (Notched Izod) as measured according to ISO Test No. 180/1 A. For instance, the Izod unnotched impact strength of the melt processed polyarylene sulfide composition may be greater than about 19 kJ/m$^2$, greater than about 23 kJ/m$^2$, or greater than about 25 kJ/m$^2$ measured at 23° C. The Izod notched impact strength of the melt processed polyarylene sulfide composition may be greater than about 10 kJ/m$^2$, or greater than about 15 kJ/m$^2$ measured at 23° C. For instance, the Izod notched impact strength can improve by more than about 40%, or more than about 45% as compared to a similar composition that does not include the compatibilizer and is merely a polyarylene sulfide/liquid crystal polymer blend.

The polyarylene sulfide phase of a polyarylene sulfide/liquid crystal alloy may exhibit a low recrystallization temperature and a low heat of crystallization, as well as a high degree of supercooling, which can indicate that the presence of the compatibilizer can retard crystallization of the polyarylene sulfide. This is a good indication of improved compatibilization of the polyarylene sulfide and the liquid crystal polymer in the alloy. For instance, the recrystallization temperature of the polyarylene sulfide phase of a polyarylene sulfide/liquid crystal polymer alloy can be less than about 225° C., or less than about 220° C. as measured by use of a differential scanning calorimeter. The polyarylene phase of a polyarylene sulfide/liquid crystal polymer alloy can have a degree of supercooling (defined as the difference between the equilibrium melting temperature, $T_m$, and the crystallization temperature, $T_c$) of greater than about 50° C., greater than about 55° C., or greater than about 60° C. as measured by use of a differential scanning calorimeter.

The polyarylene sulfide/liquid crystal polymer alloys can also exhibit good flame retardant characteristics. For instance, a polyarylene sulfide/liquid crystal polymer alloy can meet the V-0 flammability standard at a thickness of 0.2 millimeters as released by UNDERWRITERS LABORATORIES, INC. (Northbrook, Ill.)

As previously mentioned, the polyarylene sulfide/liquid crystal polymer alloy can be formed according to a process that includes melt processing a polyarylene sulfide and a reactively functionalized disulfide compound with a liquid crystalline polymer.

In general, the polyarylene sulfide may be a polyarylene thioether containing repeat units of the formula (I):

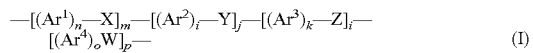

(I)

wherein Ar$^1$, Ar$^2$, Ar$^3$, and Ar$^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units Ar$^1$, Ar$^2$, Ar$^3$, and Ar$^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

The polyarylene sulfide may be synthesized prior to forming the polyarylene sulfide/liquid crystal polymer alloy, though this is not a requirement of a process. For instance Fortron® polyphenylene sulfide available from Ticona of Florence, Ky., USA can be purchased and utilized as the polyarylene sulfide.

Synthesis techniques that may be used in making a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

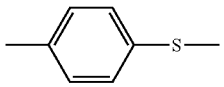
(II)

and segments having the structure of formula (III):

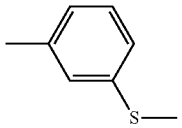
(III)

or segments having the structure of formula (IV):

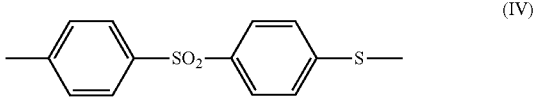
(IV)

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

When carrying out the first polymerization step, the alkali metal sulfide, which usually includes water, can be charged into the organic amide solvent and the mixture can be heated to distill the excessive water out of the reaction system. At that time, a part of the alkali metal sulfide will decompose to form an alkali and hydrogen sulfide ($H_2S$). From the generated amount of $H_2S$, the effective amount of the charged alkali metal sulfide is calculated. Thereafter, the dihaloaromatic compound can be charged into the reaction system in an amount calculated from the effective amount of the charged alkali metal sulfide and the mixture can be heated to a temperature of from about 180° C. to about 235° C. in an inert atmosphere, generating the polymerization reaction.

The termination of the first polymerization is the point wherein the conversion rate of the dihaloaromatic compound in the reaction system reaches not less than about 50 mol %, not less than about 70 mol %, or not less than about 90 mol % of the theoretical conversion. The theoretical conversion of the dihaloaromatic compound can be calculated from one of the following formulas:

(a) In the case wherein the dihaloaromatic compound (hereinafter referred to as DHA) has been added in excess (by molar ratio) of the alkali metal sulfide:

$$\text{Conversion rate} = \frac{X - Y}{X - Z} \times 100$$

(b) In the cases other than (a):

$$\text{Conversion rate} = \frac{X - Y}{X} \times 100$$

wherein X is the amount of the charged dihaloaromatic compound; Y is the remaining amount of the dihaloaromatic compound and Z is the excessive amount of dihaloaromatic compound in moles.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the polyarylene sulfide may be washed with liquid media. For instance, the polyarylene sulfide may be washed with water, acetone, N-methyl-2-pyrrolidone, a salt solution, and/or an acidic media such as acetic acid or hydrochloric acid prior to combination with other components while forming the mixture. The polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

A polyarylene sulfide can be subjected to a hot water washing process. The temperature of a hot water wash can be at or above about 100° C., for instance higher than about 120° C., higher than about 150° C., or higher than about 170° C. Generally, distilled water or deionized water can be used for hot water washing. In one embodiment, a hot water wash can be conducted by adding a predetermined amount of the polyarylene sulfide to a predetermined amount of water and heating the mixture under stirring in a pressure vessel. By way of example, a bath ratio of up to about 200 grams of polyarylene sulfide per liter of water can be used. Following the hot water wash, the polyarylene sulfide can be washed several times with warm water, maintained at a temperature of from about 10° C. to about 100° C. A wash can be carried out in an inert atmosphere to avoid deterioration of the polymer.

Organic solvents that will not decompose the polyarylene sulfide can be used for washing. Organic solvents can include, without limitation, nitrogen-containing polar solvents such as N-methylpyrrolidone, dimethylformamide, dimethylacetamide, 1,3-dimethylimidazolidinone, hexamethylphosphoramide, and piperazinone; sulfoxide and sulfone solvents such as dimethyl sulfoxide, dimethylsulfone, and sulfolane; ketone solvents such as acetone, methyl ethyl ketone, diethyl ketone, and acetophenone, ether solvents such as diethyl ether, dipropyl ether, dioxane, and tetrahydrofuran; halogen-containing hydrocarbon solvents such as chloroform, methylene chloride, ethylene dichloride, trichloroethylene, perchloroethylene, monochloroethane, dichloroethane, tetrachloroethane, perchloroethane, and chlorobenzene; alcohol and phenol solvents such as methanol, ethanol, propanol, butanol, pentanol, ethylene glycol, propylene glycol, phenol, cresol, polyethylene glycol, and polypropylene glycol; and aromatic hydrocarbon solvents such as benzene, toluene, and xylene. Further, solvents can be used alone or as a mixture of two or more thereof.

Washing with an organic solvent can be carried out by immersing the polyarylene sulfide in the organic solvent and heating or stirring as appropriate. The washing temperature for the organic solvent washing is not particularly critical, and a temperature can generally be from about 20° C. to about 300° C. Washing efficiency can be increased with an elevation of the washing temperature, but in general, a satisfactory effect is obtained at a washing temperature of from about 20° C. to about 150° C.

In one embodiment, washing can be carried out under pressure at a temperature higher than the boiling point of the organic solvent in a pressure vessel. The washing time is not critical, and for a batchwise washing, washing can generally be carried out for about 5 minutes or more. Batchwise washing is not a requirement, however, and the washing can be performed in a continuous manner.

In one embodiment, organic solvent washing can be combined with hot water washing and/or warm water washing. When a high-boiling-point organic solvent such as N-methylpyrrolidone is used, the residual organic solvent can be removed by washing with water or warm water after the organic solvent washing, and distilled water or deionized water can be used for this washing.

The polymerization reaction apparatus for forming the polyarylene sulfide is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

A polyarylene sulfide/liquid crystal polymer alloy may include a polyarylene sulfide (or a blend of multiple polyarylene sulfides) in an amount from about 5 wt. % to about 90 wt. % by weight of the alloy, for instance from about 10% wt. % to about 80 wt. %, from about 20 wt. % to about wt.70%, or from about 25 wt. % to about 50 wt. % by weight of the alloy.

A polyarylene sulfide (which can also encompass a blend of one or more polyarylene sulfide polymers and/or copolymers) may have a relative high molecular weight. For instance a polyarylene sulfide may have a number average molecular weight greater than about 25,000 g/mol, or greater than about 30,000 g/mol, and a weight average molecular weight greater than about 60,000 g/mol, or greater than about 65,000 g/mol. A high molecular weight polyarylene sulfide may have a low chlorine content, for instance less than about 1000 ppm, less than about 900 ppm, less than about 600 ppm, or less than about 400 ppm.

In one embodiment, the polyarylene sulfide may have a high molecular weight and a high melt viscosity. For instance, the melt viscosity of the polyarylene sulfide may be greater than about 1,500 poise, greater than about 2,500 poise, or greater than about 3,000 poise as determined in accordance with ISO Test No. 11443 at a shear rate of 1200 s$^{-1}$ and at a temperature of 310° C.

The polyarylene sulfide can be melt processed with a reactively functionalized disulfide compound. In general, the reactively functionalized disulfide compound may have the structure of formula (V):

$$R^3-S-S-R^4 \quad\quad (V)$$

wherein $R^3$ and $R^4$ may be the same or different and are hydrocarbon groups that independently include from 1 to about 20 carbons and include reactive functionality at the terminal ends of $R^3$ and $R^4$. For instance, $R^3$ and $R^4$ may be an alkyl, cycloalkyl, aryl, or heterocyclic group.

At least one of $R^3$ and $R^4$ may include a terminal carboxyl group, hydroxyl group, an amino group (either substituted or nonsubstituted), a nitro group, or the like. Examples of disulfide compounds including reactive terminal groups as may be combined with a polyarylene sulfide in forming a mixture for melt processing may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole), L-Cysteine, dithiobenzoic acid, dihydroxyphenyl disulfide, and 2-(4'-morpholinodithio)benzothiazole.

The amount of the disulfide compound combined with the polyarylene sulfide can generally be from about 0.1 wt. % to about 3 wt. % by weight of the polyarylene sulfide/liquid crystal polymer alloy, for instance from about 0.1 wt. % to about 1 wt. % by weight of the polyarylene sulfide/liquid crystal polymer alloy. In general, the amount of the disulfide compound added will be a stoichiometric amount for reaction with a portion of the polyarylene sulfide, for instance an amount that can react with from about 0.1% to about 5% of the polyarylene sulfide, such that the polyarylene sulfide/liquid crystal polymer can include the compatibliser in addition to polyarylene sulfide and liquid crystal polymer that have not been copolymerized.

A liquid crystal polymer can be combined with the polyarylene sulfide and the reactively functionalized disulfide compound. In one embodiment, the liquid crystal polymer may be combined with the polyarylene sulfide and the reactively functionalized disulfide compound in a single step formation process, i.e., all three components can be combined together in a single melt processing step. In another embodiment, the melt processing process can include a first melt processing step that includes melt processing the polyarylene sulfide with reactively functionalized disulfide compound, and a second melt processing step in which the liquid crystal polymer is then combined with the melt processed liquid crystal polymer and disulfide compound.

A process of forming the polyarylene sulfide/liquid crystal polymer alloy may include formation of the liquid crystal polymer, though this is not a requirement of a process. For instance, the liquid crystal polymer may be formed by reaction of monomers including an aromatic hydroxycarboxylic acid, an aromatic diol, and an aromatic diacid.

By way of example, the monomers can be polymerized by a melt acidolysis polymerization process, in which non-acetylated monomers are heated in the presence of acetic anhydride. Alternatively, the monomers can be acetylated in a first step, and the acetylated monomers can then be polymerized by a melt acidolysis process in the molten state in a second step.

In either case, the monomers may be heated with stirring to a sufficiently high temperature such that the acetylated phenol groups react with the carboxylic acid groups to form ester linkages, with the formation of by-product acetic acid. The heating and stirring can be continued for a long enough time and at a high enough temperature that a liquid crystal polymer forms that has an inherent viscosity of greater than about 2 dl/g, greater than about 3 dl/g, or greater than about 5 dl/g, with the inherent viscosity being measured at 25° C. as a 0.1% solution (wt/vol) of liquid crystal polymer in a mixture of equal volumes of pentafluorophenol and hexafluoroisopropanol. Typically, the polymerization can be completed at a temperature high enough that the liquid crystal polymer is in the molten state at a temperature in the range of from about 280° C. to about 380° C., for instance in the range of from about 320° C. to about 380° C. The liquid crystal polymer can be heated under vacuum in the molten state for up to about one hour, with the time being dependent on such variables as the temperature, the vacuum, and the stirring speed.

In one embodiment, the liquid crystal polymer can be produced via polycondensation (with elimination of acetic acid) from p-hydroxybenzoic acid, an aromatic dihydroxy compound (such as 4,4'-dihydroxybiphenyl and hydroquinone), and an aromatic dicarboxylic acid (such as 2,6-naphthalenedicarboxylic acid, terephthalic acid, and isophthalic acid), with their phenolic hydroxyl groups acylated by reaction with acetic anhydride.

Alternatively, the liquid crystal polymer can be formed via polycondensation (with elimination of acetic acid) from p-acetoxybenzoic acid, a diacylated aromatic dihydroxy compound (such as 4,4'-diacetoxybiphenyl and diacetoxybenzene), and an aromatic dicarboxylic acid (such as 2,6-naphthalenedicarboxylic acid, terephthalic acid, and isophthalic acid).

Another liquid crystal polymer preparation method can include polycondensation (with elimination of phenol) from a phenyl ester of p-hydroxybenzoic acid and a diphenyl ester of an aromatic dihydroxy compound (such as 4,4'-dihydroxybiphenyl and hydroquinone) and an aromatic dicarboxylic acid (such as 2,6-naphthalenedicarboxylic acid, terephthalic acid, and isophthalic acid).

In still another embodiment, the liquid crystal polymer can be prepared by polycondensation (with elimination of phenol) from diphenyl esters and aromatic dihydroxy compounds. The diphenyl esters can be formed from p-hydroxybenzoic acid and an aromatic dicarboxylic acid (such as 2,6-naphthalenedicarboxylic acid, terephthalic acid, and isophthalic acid) by reaction with diphenyl carbonate in a prescribed amount. The aromatic dihydroxy compounds can include 4,4'-dihydroxybiphenyl and hydroquinone.

The above-mentioned polycondensation reactions can proceed in the absence of a catalyst; however, in one embodiment they may be catalyzed by a metal compound (such as stannous acetate, tetrabutyl titanium, preferably potassium acetate, sodium acetate, and antimony trioxide) or metallic magnesium or a combination thereof. In one embodiment, the use of catalysts can be eliminated or minimized in order to prevent the resulting liquid crystal polymer from blistering. For example, in one embodiment, the liquid crystal polymer can be formed by use of less than about 500 ppm of metal catalyst, for instance less than about 200 ppm, less than about 100 ppm, less than about 50 ppm, less than about 20 ppm, or less than about 10 ppm of catalyst.

In one embodiment, the liquid crystal polymer can be formed in the presence of one or more end-capping agents. End-capping agents, for instance, can be used to control the molecular weight, melting point, and/or viscosity of the liquid crystal polymer. The end-capping agent, for instance, can be present in the liquid crystal polymer in an amount less than about 1 mole % by weight, such as in an amount less than about 0.5 mole %. In one embodiment, the end capping agent may comprise terephthalic acid in an amount less than about 0.2 mole %.

Improvements in the control of the resulting properties of the liquid crystal polymer may also be realized in one embodiment by forming the liquid crystal polymer using slight molar excesses of a diacid, a diol, or both.

In one embodiment, the liquid crystal polymer can be selected from a group of liquid crystal polymers of P1 to P8, wherein each polymer contains at least two of the following repeating units i) through viii):

i.

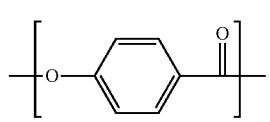

ii.
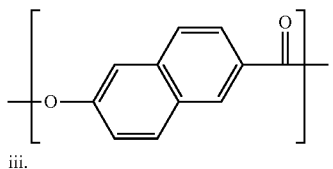

iii.
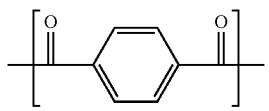

iv.
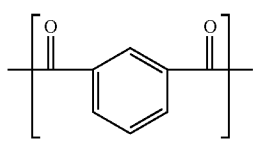

v.
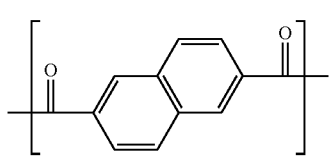

vi.
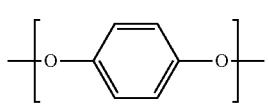

vii.
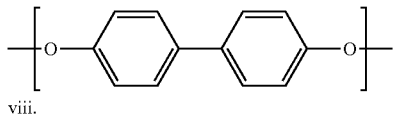

viii.
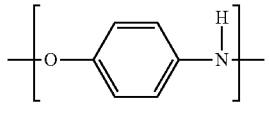

wherein the amounts of repeating units of the liquid crystal polymer are expressed in mole % and the sum of mol % of the repeating units present always totals 100%. In certain embodiments, the liquid crystal polymer can be selected from P1 to P8 as follows:

P1 comprises from about 70% to about 90% i) and from about 10% to about 30% ii); and wherein iii)-viii) are absent;

P2 comprises from about 10% to about 25% i) and from about 75% to about 90% ii) and wherein iii)-viii) are absent;

P3 comprises from about 50% to about 70% ii), iii) is present, at least one of vi), vii), and viii) is present, the amount of iii)=[100-ii)]/2, and the amount of iii)=the total of at least one of vi), vii) and viii), and wherein i), iv) and v) are absent;

P4 comprises from about 0% to about 10% i), from about 40% to about 60% ii), at least one of iii), iv) and v) is present, at least one of vi) and vii) and viii) is present, wherein the total of at least one of iii), iv) and v)=[100-Σi)+ii)]/2=the total of at least one of vi), vii) and viii);

P5 comprises from about 45% to about 65% i), from about 1% to about 10% ii), at least one of iii), iv) and v) is present, at least one of vi), vii) and viii) is present, wherein the total of at least one of iii), iv) and v)=[100-Σi)+ii)]/2=the total of at least one of vi), vii) and viii);

P6 comprises from about 40% to about 70% i), from about 5% to about 30% v), at least one of iii) and iv) are present and the total amount of at least one of iii) and iv)=[100-i)]/2-v), at least one of vi), vii) and viii) is present and the amount of at least one of vi), vii) and viii)=Σiii), iv) and v), and wherein ii) is absent;

P7 comprises from about 30% to about 80% i), at least one of vi), vii) and viii) is present, v) is present, and the amount of v)=[100-i)]/2=total of at least one of vi), vii) and viii), and wherein ii), iii) and iv) are absent.

P8 comprises from about 50% to about 70% i), at least one of iii) and iv) is present, at least one of vi) and vii) is present, and wherein the total of at least one of iii) and iv)=[100-i)]/2=the total of at least one of vi), vii) and viii), and wherein ii) is absent.

Liquid crystal polymers and/or monomers used to form the liquid crystal polymers are also commercially available, for instance under the trade name VECTRA® marketed by Ticona Engineering Polymers, of Florence, Ky.

Grades of VECTRA® polymers well suited for use in forming a polyarylene sulfide/liquid crystal polymer can include the VECTRA® Ei grades, the VECTRA® A grades, and the VECTRA® L grades.

The liquid crystal polymer selected for use in forming a polyarylene sulfide/liquid crystal polymer alloy can vary depending upon the particular application and the characteristics desired for the polyarylene sulfide/liquid crystal polymer alloy. In one embodiment, for instance, a liquid crystal polymer can be used that has a relatively high melting point, such as a melting point greater than 280° C. In one embodiment, the melting point of the liquid crystal polymer can be from about 280° C. to about 370° C., such as from about 330° C. to about 340° C. Higher melting point liquid crystal polymers can be used, for instance, to produce articles having a higher heat distortion temperature (HDT).

The amount of the liquid crystal polymer that is present in the polyarylene sulfide/liquid crystal polymer alloy can vary depending upon various factors. For instance, the polyarylene sulfide/liquid crystal polymer alloy can include from about 5 wt. % to about 90 wt. %, from about 10 wt. % to about 80 wt. %, from about 20 wt. % to about 70 wt. %, or from about 25 wt. % to about 50 wt. % of the liquid crystal polymer by weight of the alloy. The polyarylene sulfide and the liquid crystal polymer can be blended together in order to accentuate a particular strength or to obtain a desired combination of properties. In one embodiment, the liquid crystal polymer and the polyarylene sulfide polymer may be present in the polyarylene sulfide/liquid crystal polymer alloy at a weight ratio of the liquid crystal polymer to the polyarylene sulfide of from about 5:1 to about 1:5. For instance, the weight ratio of the liquid crystal polymer to the polyarylene sulfide can be from about 1:2 to about 1:3.

In one embodiment, the relative amounts of the polyarylene sulfide and the liquid crystal polymer can be selected so that the viscosity ratio between the polyarylene sulfide and the liquid crystal polymer at a temperature of about 350° C. is from about 1:10 to about 3:1. For example, the viscosities can be selectively matched such that the viscosity ratio between the polyarylene sulfide and the liquid crystal polymer is from about 1.5:1 to about 1:1.5.

The liquid crystal polymer may form domains within the polyarylene sulfide/liquid crystal polymer alloy. Liquid crystal polymer domains, for instance, may have a rod-like structure. In one embodiment, about 90% of the rod-like structures can have a diameter of from about 1 micron to about 10 microns and can have a length of from about 5 microns to about 30 microns. In one embodiment, the domains of the liquid crystal polymer within the alloy can be even smaller. For instance the liquid crystal polymer domains can have a diameter of less than about 1 micron in the polyarylene sulfide/liquid crystal polymer alloy.

As previously stated, a composition including the polyarylene sulfide/liquid crystal polymer alloy can be formed that includes one or more additives in addition to the alloy.

By way of example, a composition including a polyarylene sulfide/liquid crystal polymer alloy can include a phosphite stabilizer. A phosphite stabilizer can prevent thermal degradation of the polyarylene sulfide and the liquid crystal polymer during melt processing. In addition, a phosphite stabilizer can further minimize mold deposits and can reduce yellowing or darkening of a composition including the polyarylene sulfide/liquid crystal polymer alloy, can reduce loss of strength during melt processing, and can improve the processibility of the composition including the polyarylene sulfide/liquid crystal polymer alloy.

The phosphite stabilizer can include an organic phosphite. For example, phosphite stabilizers that are encompassed herein include phosphites capable of withstanding higher temperatures, especially temperatures to which a composition including a polyarylene sulfide/liquid crystal polymer can be subjected to during melt processing. For example, phosphite stabilizers can include monophosphites and diphosphites wherein the diphosphite has a molecular configuration that inhibits the absorption of moisture and/or has a relatively high Spiro isomer content. For instance, a diphosphite stabilizer may be selected that has a Spiro isomer content of greater than 90%, such as greater than 95%, such as greater than 98%.

Non-limiting examples of phosphite stabilizers include bis (2,4-dicumylphenyl)pentaerythritol diphosphite, bis(2,4-di-t-butylphenyl)pentaerythritol diphosphite, distearyl pentaerythritol diphosphite, mixtures thereof, and the like.

The phosphite stabilizer, tris(2,4-di-tert-butylphenyl) phosphite, may be represented by the formula (VI):

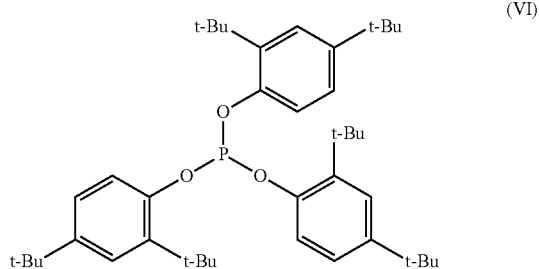 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

The phosphite stabilizer, bis(2,4-dicumylphenyl)pentaerythritol diphosphite, may be represented by the formula (VII):

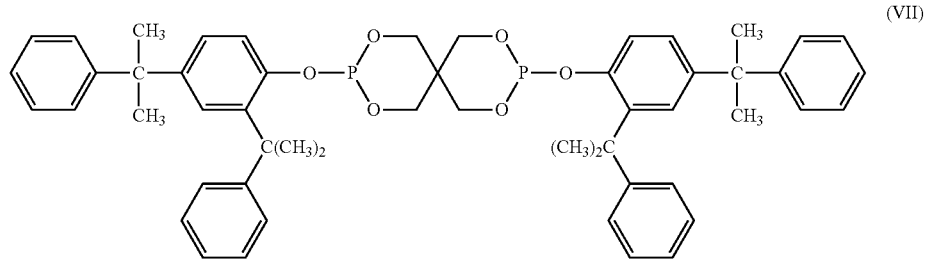

The phosphite stabilizer, distearyl pentaerythritol diphosphite, may be represented by the formula (VIII):

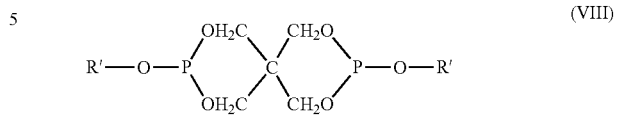

wherein R' is an alkyl group or an aryl group and the two R' groups may be the same or different.

In addition to a phosphite stabilizer, a composition including a polyarylene sulfide/liquid crystal polymer alloy can optionally contain a second stabilizer or even further stabilizers. In one embodiment, for instance, the second stabilizer may comprise a phosphate, such as an organic phosphate. For instance, in one embodiment, a non-halogen phosphate ester stabilizer can be incorporated into the composition including a polyarylene sulfide/liquid crystal polymer alloy.

Phosphate stabilizers may include monophosphates stabilizers and polyphosphate stabilizers. An example of a monophosphate stabilizer, for instance, is triphenyl phosphate. Polyphosphate stabilizers that may be used in accordance with the present disclosure include phosphate stabilizers having the following general formula (IX):

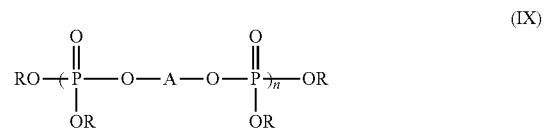

wherein R is either an unsubstituted or a substituted aryl, A is a bridging group containing an alkylene group, one arylene ring, two arylene rings either joined directly to each other or by an alkylene bridging group and n ranges from 1 to about 10. In one embodiment, A above can be a monoarylene, such as may be derived from resorcinol or hydroquinone. In the above formula, "bis" phosphates are formed when n is equal to 1. Oligomeric phosphates, on the other hand, are formed when n is equal to 2 or higher.

Examples of phosphate stabilizers that may be used in include, without limitation, resorcinol bis(di-xylyl phosphate), bis-phenol A bis(diphenyl phosphate), recorcinol bis (diphenyl phosphate) or mixtures thereof.

Phosphate stabilizers typically exist as a liquid at room temperature or as a solid. In one embodiment a solid phosphate stabilizer may be incorporated into a composition that includes a polyarylene sulfide/liquid crystal polymer alloy that may be more stable at higher temperatures and may be easier to combine with the other components.

A composition that includes a polyarylene sulfide/liquid crystal polymer may also contain an alkylene-acrylic ester interpolymer stabilizer. For instance, a random ethylene-acrylic ester interpolymer stabilizer containing maleic anhydride or containing glycidyl methacrylate may be incorporated into the composition. Such compounds are commercially available from Arkema under the trade name LOTADER®.

One or more stabilizers can be present in a composition that includes a polyarylene sulfide/liquid crystal polymer alloy in relatively small amounts. For instance, each stabilizer can be present in a composition in an amount less than about 5% by weight of the composition. For example, a phosphite stabilizer may be present in a composition that includes a polyarylene sulfide/liquid crystal polymer alloy in an amount from about 0.05% to about 5% by weight, such as from about 0.1% to about 1% by weight. Any other stabilizers may be present in an amount less than about 2% by weight, such as in an amount from about 0.1% to about 1% by weight of the composition that includes a polyarylene sulfide/liquid crystal polymer alloy.

In one embodiment, a composition that includes a polyarylene sulfide/liquid crystal polymer alloy can include a fibrous filler. The fibrous filler may generally be included in the composition including a polyarylene sulfide/liquid crystal polymer alloy an amount of from about 5 wt. % to about 70 wt. %, or from about 20 wt. % to about 65 wt. % by weight of the composition.

The fibers are typically of a length from about 0.5 mm to about 5.0 mm. While not wishing to be bound to any particular theory, it is believed that the lower melt viscosity of the polyarylene sulfide/liquid crystal polymer alloy obtainable due to interaction between the reactively functionalized disulfide compound and the polyarylene sulfide may prevent degradation of the fibers during melt processing, maintaining fiber length and providing excellent strength characteristics to a composition including the polyarylene sulfide/liquid crystal polymer alloy.

The fibrous filler may include one or more fiber types including, without limitation, polymer fibers, glass fibers, carbon fibers, metal fibers, and so forth, or a combination of fiber types. In one embodiment, the fibers may be chopped glass fibers or glass fiber ravings (tows).

In one embodiment, the fibers can be glass fibers that are essentially free of boron. The term "essentially free" generally means that the glass fibers contain no boron, or at most, only trace amounts of boron, such as less than about 2 wt. %, in some embodiments less than 1 wt. %, in some embodiments less than about 0.1 wt. %, and in some embodiments, less than 0.01 wt. %. By minimizing the presence of boron in the fibers, the chemical resistance of the glass to attack from aggressive inks used in inkjet printer can be enhanced. Boron-free fibers are available, for instance from the Owens Corning Vetrotex Corporation under the trade name of Advantex®. Such fibers may be made from suitable ingredients or raw materials (e.g., sand for $SiO_2$, burnt lime for CaO, dolomite for MgO), which can be mixed or blended in a conventional manner in the appropriate quantities to give the desired weight percentages of the final composition. The mixed batch can then be melted in a furnace or melter, and the resulting molten glass can be passed along a forehearth and into fiber-forming bushings located along the bottom of the forehearth. The molten glass can be pulled or drawn through holes or orifices in the bottom or tip plate of the bushing to form glass fibers. The streams of molten glass flowing through the bushing orifices can be attenuated to filaments by winding a strand of the filaments on a forming tube mounted on a rotatable collet of a winding machine. The fibers may be further processed in a conventional manner suitable for the intended application.

Fiber diameters can vary depending upon the particular fiber used and are available in either chopped or continuous form. The fibers, for instance, can have a diameter of less than about 100 µm, such as less than about 50 µm. For instance, the fibers can be chopped or continuous fibers and can have a fiber diameter of from about 5 µm to about 50 µm, such as from about 5 µm to about 15 µm.

Fiber lengths can vary. In one embodiment, the fibers can have an initial length of from about 3 mm to about 5 mm. The melt processing conditions due to the combination of the reactively functionalized disulfide compound with the polyarylene sulfide can prevent excessive degradation of the added fibers and as a result the fibers can show less attrition during melt processing. For instance, the final fiber length in the composition including the polyarylene sulfide/liquid crystal polymer alloy can vary from about 200 µm to about 1500 µm, or from about 250 µm to about 1000 µm.

The fibers may be pretreated with a sizing that may also facilitate mixing with the polyarylene sulfide/liquid crystal polymer alloy during melt processing.

In one embodiment, the fibers may have a high yield or small K numbers. The tow is indicated by the yield or K number. For instance, glass fiber tows may have 50 yield and up, for instance from about 115 yield to about 1200 yield.

In one embodiment, the polyarylene sulfide/liquid crystal polymer alloy can include an organosilane coupling agent. An organosilane coupling agent may be an alkoxy silane coupling agent as is known in the art. The alkoxysilane compound may be a silane compound selected from the group consisting of vinlyalkoxysilanes, epoxyalkoxysilanes, aminoalkoxysilanes, mercaptoalkoxysilanes, and combinations thereof. Examples of the vinylalkoxysilane that may be utilized include vinyltriethoxysilane, vinyltrimethoxysilane and vinyltris(β-methoxyethoxy)silane. Examples of the epoxyalkoxysilanes that may be used include γ-glycidoxypropyltrimethoxysilane, β-(3,4-epoxycyclohexyl)ethyltrimethoxysilane and γ-glycidoxypropyltriethoxysilane. Examples of the mercaptoalkoxysilanes that may be employed include γ-mercaptopropyltrimethoxysilane and γ-mercaptopropyltriethoxysilane.

Amino slime compounds that may be included are typically of the formula: $R^5—Si—(R^6)_3$, wherein $R^5$ is selected from the group consisting of an amino group such as $NH_2$; an aminoalkyl of from about 1 to about 10 carbon atoms, or from about 2 to about 5 carbon atoms, such as aminomethyl, aminoethyl, aminopropyl, aminobutyl, and so forth; an alkene of from about 2 to about 10 carbon atoms, or from about 2 to about 5 carbon atoms, such as ethylene, propylene, butylene, and so forth; and an alkyne of from about 2 to about 10 carbon atoms, or from about 2 to about 5 carbon atoms, such as ethyne, propyne, butyne and so forth; and wherein $R^6$ is an alkoxy group of from about 1 to about 10 atoms, or from about 2 to about 5 carbon atoms, such as methoxy, ethoxy, propoxy, and so forth.

In one embodiment, $R^5$ is selected from the group consisting of aminomethyl, aminoethyl, aminopropyl, ethylene, ethyne, propylene and propyne, and $R^6$ is selected from the group consisting of methoxy groups, ethoxy groups, and propoxy groups. In another embodiment, $R^5$ is selected from the group consisting of an alkene of from about 2 to about 10 carbon atoms such as ethylene, propylene, butylene, and so forth, and an alkyne of from about 2 to about 10 carbon atoms such as ethyne, propyne, butyne and so forth, and $R^6$ is an alkoxy group of from about 1 to about 10 atoms, such as methoxy group, ethoxy group, propoxy group, and so forth. A combination of various aminosilanes may also be included.

Some representative examples of amino silane coupling agents that may be utilized include, without limitation, aminopropyl triethoxy silane, aminoethyl triethoxy silane, aminopropyl trimethoxy silane, aminoethyl trimethoxy silane, ethylene trimethoxy silane, ethylene triethoxy silane, ethyne trimethoxy silane, ethyne triethoxy silane, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl)tetramethoxy silane, bis(3-aminopropyl)tetraethoxy disiloxane, and combinations thereof. The amino silane may also be an aminoalkoxysilane, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. One suitable amino silane is 3-aminopropyltriethoxysilane which is available from Degussa, Sigma Chemical Company, and Aldrich Chemical Company.

When included, the composition including the polyarylene sulfide/liquid crystal polymer alloy may include the organosilane coupling agent in an amount from about 0.1 wt. % to about 5 wt. % by weight of the mixture, from about 0.3 wt. % to about 2 wt. % by weight of the mixture, or from about 0.2 wt. % to about 1 wt. % by weight of the composition.

An impact modifier may be included in a composition including a polyarylene sulfide/liquid crystal polymer alloy. In one embodiment, the impact modifier may comprise a random copolymer of polyethylene and glycidyl methacrylate. The amount of glycidyl methacrylate contained in the random copolymer may vary. In one particular embodiment, the random copolymer contains the glycidyl methacrylate in an amount from about 6% to about 10% by weight of the copolymer.

Other impact modifiers as may be utilized include polyurethanes, two-phase mixtures of polybutadiene and styrene-acrylonitrile (ABS), modified polysiloxanes or silicone rubbers, or graft copolymers of an elastomeric, single-phase core based on polydiene and of a hard graft shell (core-shell structure).

When considering graft copolymer impact modifiers, the impact modifiers are composed of particles most of which, for instance more than 70% of which, have a structure composed of a core and one or more shells. The core can be formed from an elastomeric polymer phase onto which has been grafted the hard shell, which may be composed of two or more layers. The core is generally a single-phase of the elastomeric soft phase and includes only small amounts of, if any, hard polymer constituents of the shell. The graft copolymer can be composed of from 40 to 95% by weight, from 60 to 90% by weight, or from 70 to 80% by weight, of the elastomeric core. The proportion of the shells can be from 5 to 60% by weight, from 10 to 40% by weight, or from 20 to 30% by weight.

Other impact modifiers encompassed herein include polyurethanes, e.g., thermoplastic polyurethanes. Polyurethane impact modifiers are prepared in a known manner via polyaddition of polyisocyanates, in particular diisocyanates, polyesters, polyethers, polyesteramides, polyacetals, or other suitable hydroxy or amino compounds, e.g. hydroxylated polybutadiene, or mixtures of the abovementioned compounds. Where appropriate, use is also made of chain extenders, such as low-molecular-weight polyols, in particular diols, polyamines, in particular diamines, or water.

In one embodiment, one or more mineral fillers can be included in the composition including the polyarylene sulfide/liquid crystal polymer alloy. For instance, the composition can include one or more mineral fillers in an amount of from about 1 wt. % to about 50 wt. % of the composition. Mineral fillers may include, without limitation, silica, quartz powder, silicates such as calcium silicate, aluminum silicate, kaolin, talc, mica, clay, diatomaceous earth and wollastonite, and so forth.

Still other additives that can be included in a composition including a polyarylene sulfide/liquid crystal polymer alloy can encompass, without limitation, antimicrobials, pigments, lubricants, antioxidants, stabilizers, surfactants, waxes, flow promoters, solid solvents, and other materials added to enhance properties and processability. Such optional materials may be employed in a composition in conventional amounts.

A composition including a polyarylene sulfide/liquid crystal polymer alloy may be formed in a single step melt processing process in which all of the components, e.g., the polyarylene sulfide, the liquid crystal polymer, the reactively functionalized disulfide compound, and one or more additives may be combined in an extruder. Alternatively, a composition may be formed in a multi-step process. For instance, the polyarylene sulfide and the reactively functional disulfide compound may be combined in a first melt processing step, and the liquid crystal polymer and one or more additives may be combined with the melt processed polyarylene sulfide and reactively functionalized disulfide compound in one or more subsequent steps. In yet another alternative method, one or more additives may first be combined with the polyarylene sulfide, separately or in conjunction with combination with the reactively functionalized disulfide compound.

The components may be melt processed according to techniques known in the art. For example, the components of the composition including the polyarylene sulfide/liquid crystal polymer alloy may be melt-kneaded in a single-screw or Multi-screw extruder at a temperature of from about 250° C. to about 320° C. In one embodiment, the composition may be melt processed in an extruder that includes multiple temperature zones. For instance, the composition may be melt processed in an extruder that includes a temperature zone that is maintained at a temperature of between about 250° C. and about 320° C.

By way of example, a polyarylene sulfide, a reactively functionalized disulfide compound, a liquid crystal polymer and one or more additives may be melt mixed using a twin screw extruder such as a Leistritz 25 mm co-rotating fully intermeshing twin screw extruder to form the composition including the polyarylene sulfide/liquid crystal polymer alloy. An extruder may have multiple temperature control zones, e.g., about 6 temperature control zones (including at the extrusion die), and an overall L/D of 30. A general purpose screw design can be used during melt processing. In one embodiment, all of the components may be fed to the feed throat in the first barrel by means of a volumetric feeder. In another embodiment, different components may be added at different addition points in the extruder, as is known. The components can be melted and mixed then extruded as the composition including the polyarylene sulfide/liquid crystal polymer alloy through a die. The composition can then be quenched in a water bath to solidify and granulated in a pelletizer followed by drying, e.g., drying at about 120° C.

Conventional shaping processes for forming articles out of a composition including a polyarylene sulfide/liquid crystal polymer alloy include, without limitation, extrusion, injection molding, blow-molding, thermoforming, foaming, compression molding, hot-stamping, fiber spinning and so forth. Shaped articles that may be formed may include structural and non-structural shaped parts, for instance for appliances, electrical materials, electronic products, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, and pond liners, to name a few. Other useful articles besides moldings, extrusion and fibers include wall panels, overhead storage lockers, serving trays, seat backs, cabin partitions, window covers, and electronic packaging handling systems such as integrated circuit trays.

A composition including a polyarylene sulfide/liquid crystal polymer alloy can be used in a variety of electrical and electronics applications, for instance in electrical and electronics applications in which a low chlorine content is desirable. For instance, utilization of a composition including a polyarylene sulfide/liquid crystal polymer in the formation of connectors and over-molding (insert-molding) parts is encompassed.

A composition including a polyarylene sulfide/liquid crystal polymer alloy also exhibit good thermal properties that make them excellent materials for high temperature applications. For example, the high DTUL of the compositions including polyarylene sulfide/liquid crystal polymer alloys make them excellent candidates for lead-free soldering processing and also beneficial for insert-molding parts, for instance those that may undergo high temperature painting processes.

Figure 2:
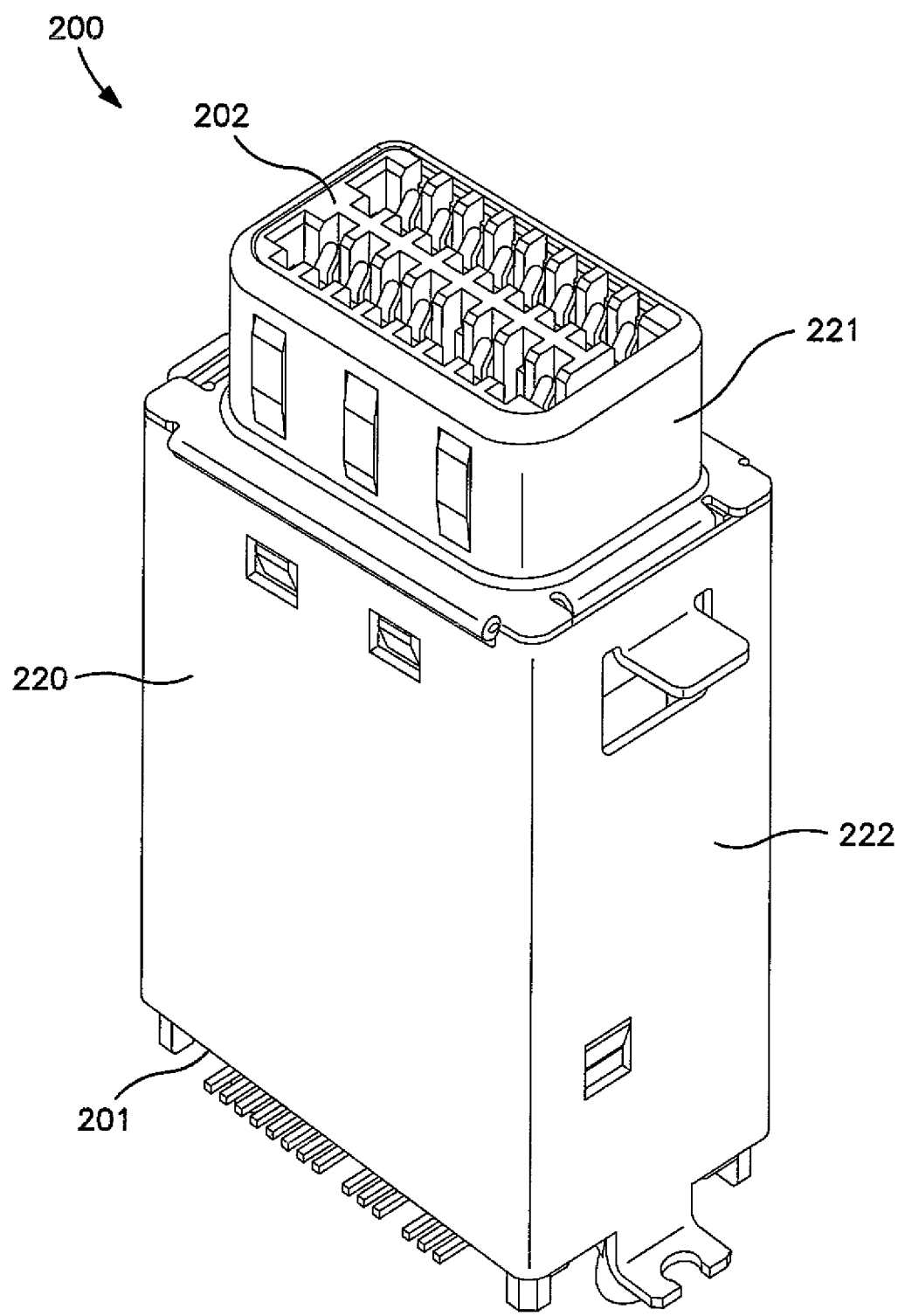
FIG. 2 is the electrical connector of FIG. 1 as formed.

According to one embodiment, a composition including a polyarylene sulfide/liquid crystal polymer alloy can be utilized in forming an electrical connector. Referring to FIGS. 1-2, an electrical connector 200, for instance as may be utilized for mounting to a printed circuit board (not shown) can be formed. Electrical connector 200 includes an insulative housing 210, a plurality of contact modules 230 inserted into the insulative housing 210, and a shield 220 that encloses the insulative housing 210. The electrical connector 200 is straight and defines a mounting face 201 parallel to a top face of the printed circuit board and a mating face 202 opposite to the mounting face 201.

The insulative housing 210 and the shield 220 can each be a one-piece structure unitarily molded of a composition including a polyarylene sulfide/liquid crystal polymer alloy that can be the same or different from one another. The shield 220 can be a two-piece structure which includes a first shell 221 and a second shelf 222, and each shell can be formed of the same or different composition including a polyarylene sulfide/liquid crystal polymer alloy as described herein. The insulative housing 210 has a base portion 211 and a rectangular mating port 212 extending upwardly from the base portion 211 for mating with a complementary plug (not shown) in an up to down direction. The base portion 211 defines a downwardly facing longitudinal cavity for receiving the plurality of contact modules 230 therein. The mating port 212 of the insulative housing 210 has a front wall 321, a back wall 322 parallel to the front wall 321, and a pair of sidewalls 323 connected the front and the back wall 321, 322. The mating port 212 includes a tongue plate 224 paralleled to the front and back wall 321, 322 and extending therebetween. Passageways 225 allow for contact between the contact modules 230 and the circuit board.

A composition including a polyarylene sulfide/liquid crystal polymer alloy can be useful in forming an overmolding that includes a coating of the composition on a metal body. The metal body may be any one of various metal bases or a metal base with an undercoat formed in advance with an inorganic material and/or an organic material.

The metal base material can include, without limitation, aluminum, iron, titanium, chromium, nickel, and alloys containing at least one of these metals, for example, duralumin, carbon steel and stainless steel can provide heat resistance, corrosion resistance, adhesion properties, mechanical characteristics, economy and the like.

The overmolding can be formed by providing at least one coating layer of a composition including a polyarylene sulfide/liquid crystal polymer alloy on a metal base. By way of example, the coating process can include a pretreatment of a metal base that is conducted prior to the formation of the coating layer. A pretreatment can improve adhesion between the metal base and the coating layer. Pretreatment generally includes cleaning, surface roughening or surface modification, or a combination thereof.

Cleaning can be carried out with a detergent, a solvent, an acid or an alkali, or a removal treatment of rust or burrs with a derusting agent, by a physical method (sand blasting, honing or the like) or a high-temperature heating treatment. Surface roughening can be, e.g., a chemical roughening treatment with an oxidizing agent, electrolytic oxidation or a physical method such as sand blasting. Surface modification can improve the adhesion of the metal base to the coating layer. It can include a surface oxidation treatment (e.g., with an oxidizing agent, or by electrolytic oxidation or high-temperature oxidation), a surface-nitriding treatment, or a surface-hydroxylating treatment (by steaming).

Optionally, an undercoat may be applied, for instance to reduce the difference in the coefficient of linear expansion between the metal base and the coating layer, to improve the adhesion between the metal base and the coating layer, and to prevent corrosion of the metal base upon its coating treatment. When included, an undercoat may include inorganic material layers such as ceramic layers, glass layers and cermet layers as well as layers of the same kind as the coating layer or of a kind different from the coating layer. Methods for coating may include, without limitation, slurry coating, powder coating, fluidized bed coating and electrostatic coating.

Following pretreatment and formation of any undercoat layer(s), a composition including a polyarylene sulfide/liquid crystal polymer alloy can be coated on the metal base to form a coating layer. The coating layer can be formed according to any standard coating method as is generally known in the art including, without limitation, slurry coating, powder coating, fluidized bed coating and electrostatic coating.

Depending on the application purpose of the overmolding, a coating layer of a kind different from the layer of the composition including a polyarylene sulfide/liquid crystal polymer alloy and any undercoat may be applied additionally as an intermediate coating layer or a topcoat. For instance, a topcoat of a fluoroplastic or fluorinated polymer composition can be formed on the coating layer of the composition including a polyarylene sulfide/liquid crystal polymer alloy.

An overmolding may be used in a wide variety of applications, such as components for automobiles, trucks, commercial airplanes, aerospace, rail, household appliances, computer hardware, hand held devices, recreation and sports, structural component for machines, structural components for buildings, etc.

Wireless electronic devices are particularly suitable. For example, the overmolding may serve as a housing for a wireless electronic device. In such embodiments, an antenna may be disposed on and/or within the metal component prior to overmolding. The metallic component itself may also be used as part of the antenna. For example, portions of the metal component may be shorted together to form a ground plane in or to expand a ground plane structure that is formed from a planar circuit structure, such as a printed circuit board structure (e.g., a printer circuit board structure used in forming antenna structures). Alternatively, the antenna may also be embedded within the composition including a polyarylene sulfide/liquid crystal polymer alloy during the molding process. Other discrete components can also be embedded within the composition including a polyarylene sulfide/liquid crystal polymer alloy, such as metal stampings, bushings, electromechanical parts, filtration materials, metal reinforcement and other discrete parts that are combined into a single unitary component through the injection of thermoplastic around the carefully placed parts.

Examples of suitable wireless electronic devices may include a desktop computer or other computer equipment, a portable electronic device, such as a laptop computer or small portable computer of the type that is sometimes referred to as "ultraportables." In one suitable arrangement, the portable electronic device may be a handheld electronic device. Examples of portable and handheld electronic devices may include cellular telephones, media players with wireless communications capabilities, handheld computers (also sometimes called personal digital assistants), remote controls, global positioning system ("GPS") devices, and handheld gaming devices. The device may also be a hybrid device that combines the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, has music player functionality and supports web browsing.

Figure 3:
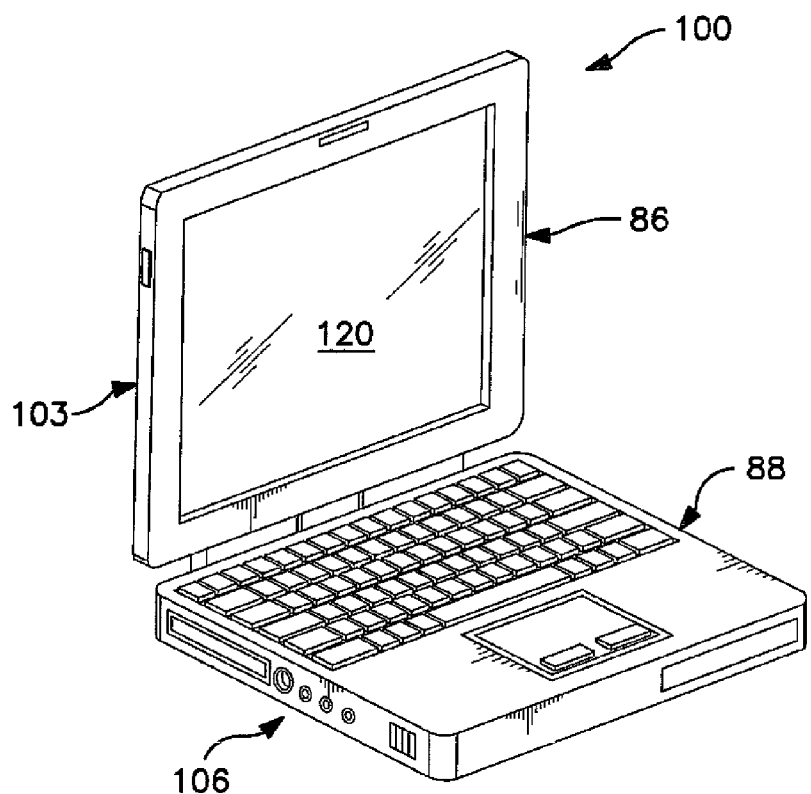
FIG. 3 is a perspective view of an electronic device that contains an overmolding that includes a polyarylene sulfide/liquid crystal polymer alloy in accordance with one embodiment of the present disclosure.
Figure 4:
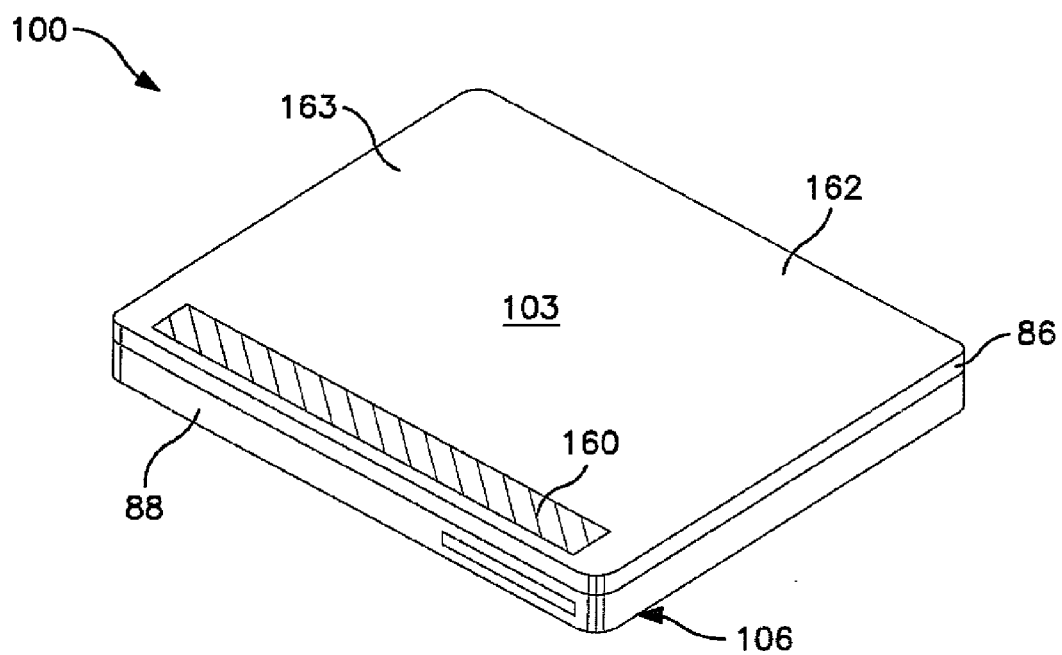
FIG. 4 is a perspective view of the electronic device of FIG. 3, shown in a closed configuration.

Referring to FIGS. 3-4, one particular embodiment of a wireless electronic device 100 is shown as a laptop computer. The electronic device 100 includes a display member 103 rotatably coupled to a base member 106. The display member 103 may be a liquid crystal diode (LCD) display, an organic light emitting diode (OLED) display, a plasma display, or any other suitable display. The display member 103 and the base member 106 each contain a housing 86 and 88, respectively, for protecting and/or supporting one or more components of the electronic device 100. The housing 86 may, for example, support a display screen 120 and the base member 106 may include cavities and interfaces for various user interface components (e.g. keyboard, mouse, and connections to other peripheral devices).

A composition including a polyarylene sulfide/liquid crystal polymer alloy may generally be employed to form any portion of the electronic device 100. In most embodiments, however, the composition is employed to form all or a portion of the housing 86 and/or 88. For example, the housing 86 shown in FIG. 2 can be formed from an overmolding and contain a composition including a polyarylene sulfide/liquid crystal polymer alloy 160 adhered to an interior surface (not shown) of a metal component 162. In this particular embodiment, the composition including a polyarylene sulfide/liquid crystal polymer alloy 160 is in the form of a strip, which may optionally cover an antenna (not shown) located in the housing 86. Of course, the antenna and/or composition including a polyarylene sulfide/liquid crystal polymer alloy 160 may be disposed at other locations of the housing 86, such as adjacent to a corner, along an edge, or in any other suitable position. Regardless, the resulting housing including the composition of a polyarylene sulfide/liquid crystal polymer alloy 160 and a metal component 162 defines an exterior surface 163 of the housing 86. The exterior surface 163 is generally smooth, and is indicated above, has a similar color and visual appearance.

Although not expressly shown, the device 100 may also contain circuitry as is known in the art, such as storage, processing circuitry, and input-output components. Wireless transceiver circuitry in circuitry may be used to transmit and receive radio-frequency (RF) signals. Communications paths such as coaxial communications paths and microstrip communications paths may be used to convey radio-frequency signals between transceiver circuitry and antenna structures. A communications path may be used to convey signals between the antenna structure and circuitry. The communications path may be, for example, a coaxial cable that is connected between an RF transceiver (sometimes called a radio) and a multiband antenna.

Figure 5:
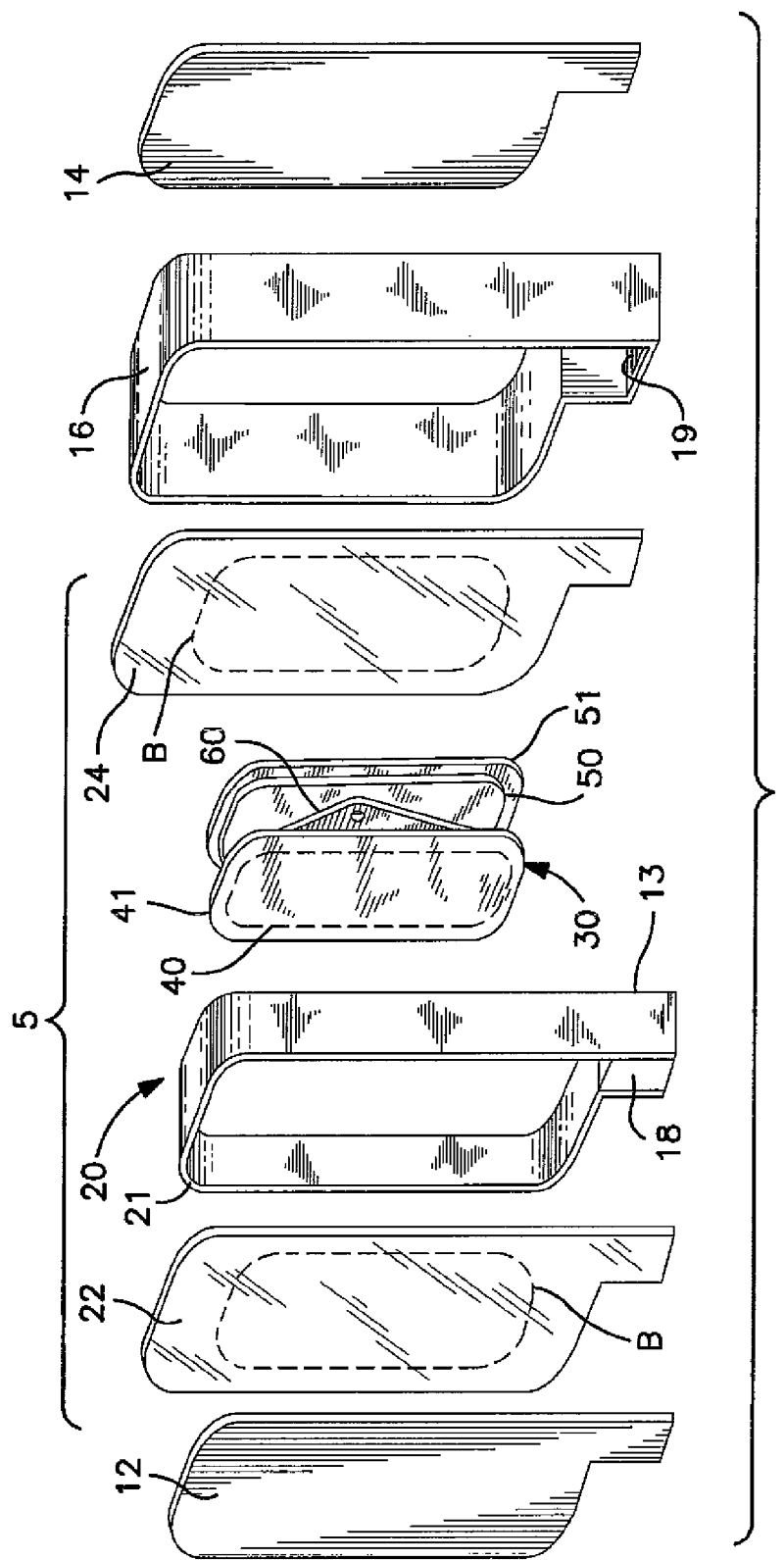
FIG. 5 illustrates an ink jet printer cartridge that may contain the polyarylene sulfide/liquid crystal polymer alloy described herein.

According to one embodiment, the polyarylene sulfide/ liquid crystal polymer alloy may be used to form an ink jet printer or a component of an ink jet printer, such as a printer cartridge, a manifold, a housing, etc. In one embodiment, the composition can be incorporated throughout the entire assembly of a printer. FIG. 5 shows one embodiment of a printer cartridge that may incorporate the polyarylene sulfide/ liquid crystal polymer alloy of the present invention. As shown, the ink cartridge contains a rigid outer housing 10 having a pair of spaced cover plates 12, 14 intended to be affixed as by heat bonding, or adhesive, or preferably press fit through interlocking tabs to opposite sides of a peripheral wall section 16. In one embodiment, the cover plates 12, 14 and/or the wall section 16 may be formed of the polyarylene sulfide/liquid crystal polymer alloy of the present invention. A snout portion 13 of the cartridge has an ink discharge aperture in its lowermost end wall to which is affixed an electrically driven print head (not shown).

An inner reservoir structure unit 5, which includes a relatively rigid inner plastic frame 20 and a pair of ink sidewalls 22, 24, is mounted in the outer housing 10. In one embodiment, the sidewalls 22, 24 and/or frame 20 may be formed of the polyarylene sulfide/liquid crystal polymer alloy of the present invention. The frame 20 has a pair of opposite side edges 21 to which the sidewalls 22, 24 are joined at their peripheral edges to form a reservoir structure. The reservoir structure contains a pressure regulator 30, which in turn can be formed of a pair of spaced substantially parallel metal side plates 40, 50 urged apart by a bow spring 60 toward the flexible membranes 22, 24. The assembled reservoir structure can then be mounted inside of wall section 16 of the cartridge and side walls 12, 14 can then be affixed to the cartridge housing peripheral wall 16. The snout portion 13 of the housing 10 also contains an ink filter 18 that can be placed in fluid communication with the ink reservoir. The filter 18 may be mounted inside the reservoir structure or it can be positioned outside of the reservoir structure but inside outer housing 10 with minor porting and seal modifications to ensure fluid communication from the ink reservoir to the filter 18. The lowermost portion of the peripheral outer housing wall 16 can be provided with an ink discharge aperture through which ink is downwardly discharged from the filter 18 to the print head (not shown). An edge guard in the form of a thin but tough cover layer 41, 51, which can also be formed of a polyarylene sulfide/liquid crystal polymer alloy, having an adhesive on one surface thereof may be press bonded to the outer surface of each side plate 40, 50 if desired. The cover layers 41, 51 are each sized slightly larger than the side plates 40, 50 so that a marginal width of the cover layers extends beyond each edge of the plates 40, 50.

Test Methods

Melt Viscosity: The melt viscosity is reported as scanning shear rate viscosity. Scanning shear rate viscosity as reported herein was determined in accordance with ISO Test No. 11443 (technically equivalent to ASTM D3835) at a shear rate of 1200 s$^{-1}$ and at a temperature of 310° C. using a Dynisco 7001 capillary rheometer. The rheometer orifice (die) had a diameter of 1 mm, a length of 20 mm, an L/D ratio of 20.1, and an entrance angle of 180°. The diameter of the barrel was 9.55 mm±0.005 mm and the length of the rod was 233.4 mm.

Melt Stability: The melt stability was determined in accordance with ISO Test No. 11443 (technically equivalent to ASTM D3835). The test was performed at 310° C. and at a constant shear rate.

Tensile Modulus, Tensile Stress, and Tensile Elongation: Tensile properties were tested according to ISO Test No. 527 (technically equivalent to ASTM D638). Modulus and strength measurements were made on the same test strip sample having a length of 80 mm, thickness of 10 mm, and width of 4 mm. Testing temperature was 23° C., and testing speed was 5 mm/min.

Flexural Modulus, Flexural Stress, and Flexural Strain: Flexural properties were tested according to ISO Test No. 178 (technically equivalent to ASTM D790). This test was performed on a 64 mm support span. Tests were run on the center portions of uncut ISO 3167 multi-purpose bars. Testing temperature was 23° C., and testing speed was 2 mm/min.

Weldline Tensile Modulus, Weldline Tensile Strength and Weldline Tensile Strain were tested according to ISO Test No. 527 (technically equivalent to ASTM D638). This test was performed on double-gated tensile bars having a length of 80 mm, thickness of 10 mm, and width of 4 mm. Testing temperature was 23° C., and testing speed was 5 mm/min.

Izod Unnotched Impact Strength: Unnotched Izod properties were determined according to ISO Test No. 180/1 U. Specimens were cut from the center of a multi-purpose bar using a single tooth milling machine. Testing temperature was 23° C.

Izod Notched Impact Strength: Notched Izod properties were tested according to ISO Test No. 180/1A (technically equivalent to ASTM D256). This test was run using a Type A notch. Specimens were cut from the center of a multi-purpose bar using a single tooth milling machine. Testing temperature was 23° C.

Deflection Under Load Temperature ("DTUL"): The deflection under load temperature was determined in accordance with ISO Test No. 75-2 (technically equivalent to ASTM D648-07). A test strip sample having a length of 80 mm, thickness of 10 mm, and width of 4 mm was subjected to an edgewise three-point bending test in which the specified load (maximum outer fibers stress) was 1.8 MPa. The specimen was lowered into a silicone oil bath where the temperature is raised at 2° C. per minute until it deflects 0.25 mm (0.32 mm for ISO Test No. 75-2).

Chlorine Content: Chlorine content was determined according to an elemental analysis using Parr Bomb combustion followed by Ion Chromatography.

Gloss reduction is used to measure the deposit generation. A gloss meter is used to measure the glossiness of the mold surface first on the clean mold surface before molding and then on the mold surface after one hour of molding.

Gloss reduction (%) is defined as follows:

Gloss reduction (%)=(glossiness before molding−glossiness after 1 hour of molding)/glossiness before molding×100

Glossiness readings are taken at two different locations of the mold surface with three repeat measurements at each location. The average of the readings is taken for calculating the gloss reduction. Lower gloss reduction corresponds to less deposit generated on the mold.

Any suitable gloss meter may be used to measure glossiness, such as Micro-TRI-Gloss from BYK Gardner GmbH.

Pre crystallization Heat of Fusion, $1^{st}$ Heat of Fusion, $2^{nd}$ Heat of Fusion, and Heat of Recrystallization were determined by Differential Scanning calorimeter (DSC). The sample was ramped from 40° C. to 340° C. with a ramp rate of 10° C./min.

The Degree of Crystallinity was calculated using a value of 146.2 J/g for the enthalpy of fusion of 100% crystalline polyphenylene sulfide.

Flammability was determined according to the UL-94 standard. The sample was subjected to a vertical burn test. The specimen is exposed to the flame for a period of ten seconds and then observed to determine the length of time required for the after flame to extinguish. The specimen is then re-exposed to the flame for another ten second period and again observed to determine time required for the afterflame to extinguish. After such time, the specimen is further observed to determine the amount of time the specimen afterglows.

Morphology of fractured tensile bars was investigated by use of a JOEL scanning electron microscope.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Example 1

A polyphenylene sulfide (Fortron® 0214 natural polyphenylene sulfide available from Ticona Engineering Polymers) is melt processed at 310° C. with one of several different disulfide compounds as follows:

L-Cystine
Diphenyl disulfide (DPDS)
Dithiobenzoic acid (DTSA)
Dihydroxyphenyl disulfide (DHDS)
4-Aminophenyl disulfide (4-APDS)
2-Aminophenyl disulfide (2-APDS)

Figure 6:
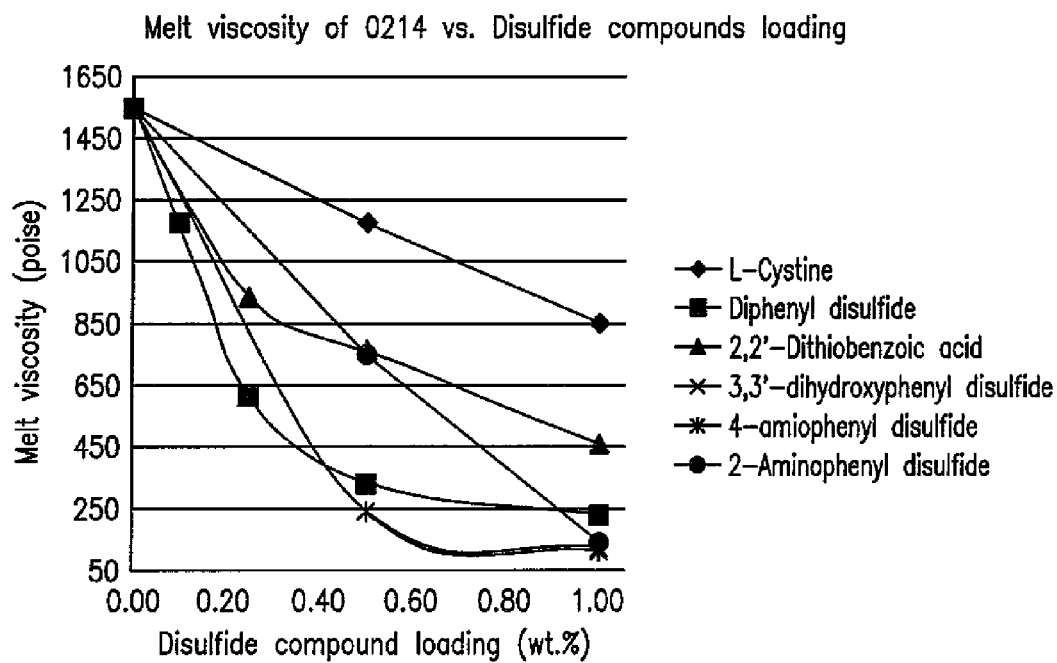
FIG. 6 graphically illustrates the change in melt viscosity of a polyarylene sulfide as a function of the loading level of a variety of different disulfide compounds.

The loading level of each disulfide compound is varied up to 1 wt. % disulfide. The melt viscosity obtained for each sample is illustrated in FIG. 6. As can be seen, melt processing of a disulfide compound with a polyarylene sulfide leads to a reduction in melt viscosity of the product.

Example 2

Materials that are used in forming samples for testing include the following components:
Reactively Functionalized Disulfide Compound
    2,2'Dithodibenzoic Acid
    3,3'Dihydroxyldiphenyl Disulfide
Lubricant
    Pentaerythritol Tetrastearate
    Polytetrafluoroethylene available under the trade name Dyneon®
Glass Fiber
    Fiber glass 910A-10C 4 mm, available from Owens Corning, Inc.
Polyarylene Sulfide
    Fortron® 0214 natural polyphenylene sulfide available from Ticona Engineering Polymers.
    Fortron® 0214 MP polyphenylene sulfide available from Ticona Engineering Polymers.
    Fortron® 0203BG SF3001 Natural polyphenylene sulfide available from Ticona Engineering Polymers
Liquid Crystal Polymer
    Vectra® E950iRX available from Ticona Engineering Polymers.
    Vectra® E950I, VD3003K20, BLACK available from Ticona Engineering Polymers.

The specific formulation for each tested material is provided in Table 1, below.

TABLE 1

| Sample No. | 001 | 002 | 003 | 004 | 005 | 006 |
|---|---|---|---|---|---|---|
| 2,2'-Dithiodibenzoic acid | — | 0.40% | — | — | | 0.2% |
| 3,3'-Dihydroxyldiphenyl Disulfide | — | — | — | 0.10% | | |
| PETS | 0.3% | 0.3% | 0.3% | 0.3% | 0.3% | 0.3% |
| PTFE | 2.0% | 2.0% | 2.0% | 2.0% | 2.0% | 2.0% |
| Vectra ® E950iRX | 14.3% | 13.9% | 14.3% | 14.2% | 32.7% | 32.5% |
| Vectra ® E9500I, VD3003K20, BLACK | 5.0% | 5.0% | 5.0% | 5.0% | 5% | 5% |
| Glass fiber | 40.0% | 40.0% | 40.0% | 40.0% | 40% | 40% |
| Fortron ® 0214 | — | 38.4% | — | 38.4% | | 20% |
| Fortron ® 0214 MB | — | — | 38.4% | — | | |
| Fortron ® 0203BG SF3001 | 38.4% | — | — | — | 20% | |
| Total | 100% | 100% | 100% | 100% | 100% | 100% |

To form Samples 001, 002, and 004, the components as described below are mixed in a Werner Pfleiderer ZSK 25 co-rotating intermeshing twin-screw extruder with a 25 mm diameter.

Sample 003 is formed according to a two-step process in which the polyarylene sulfide and the reactively functionalized disulfide compound are first mixed and then the remaining components are combined with this melt mixed combination. Polyphenylene sulfide used in this sample is first functionalized with the reactively functionalized disulfide compound through a reactive extrusion process in a twin screw extruder. The functionalized polyphenylene sulfide is then blended with other ingredients in a twin screw extruder.

Samples are molded on a Mannesmann Demag D100 NMI injection molding machine.

The extruded pellets are tested for various physical characteristics, with results described in Table 2, below.

TABLE 2

| Sample No. | 001 | 002 | 003 | 004 | 005 | 006 |
|---|---|---|---|---|---|---|
| Melt Viscosity (poise) | 403.00 | 386.00 | 436.00 | 520.00 | 355 | 434 |
| Melt Stability (% loss/min) | 0.14 | 1.62 | 3.27 | 1.31 | — | — |
| Tensile Modulus (MPa) | 15420 | 14734 | 14941 | 15147 | 17017 | 16379 |
| Tensile Break Stress (MPa) | 143.38 | 140.09 | 143.36 | 143.33 | 97.51 | 116.63 |
| Tensile Break Strain (%) | 1.24 | 1.28 | 1.30 | 1.30 | 0.76 | 1.00 |
| Weldline Tensile Modulus (MPa) | 10020.00 | 9610.00 | 10062.00 | 9505.00 | — | — |
| Weldline Tensile Strength (MPa) | 28.73 | 32.61 | 37.30 | 37.36 | 16.29 | 19.97 |
| Weldline Tensile Strain (%) | 0.29 | 0.36 | 0.39 | 0.42 | 0.21 | 0.25 |
| Izod Unnotched (kJ/m$^2$) | 23.90 | 26.30 | 23.20 | 26.60 | 16.00 | 20.70 |
| DTUL (° C.) | 268.00 | 264.00 | 267.00 | 264.00 | 262 | 257 |
| Surface Glossiness | 59.46 | 70.37 | 70.90 | 64.47 | — | — |

The polyphenylene sulfide phase of the materials is examined, with characteristics determined as described in Table 3, below.

TABLE 3

| Sample No. | 001 | 002 | 003 | 004 |
|---|---|---|---|---|
| Precrystallization Temp (° C.) | 103.71 | 123.23 | 104.57 | 107.66 |
| Precrystallization Heat of Fusion (J/g) | 0.82 | 7.49 | 0.67 | 0.68 |
| 1$^{st}$ Heat Melt Temp (° C.) | 283.07 | 282.61 | 282.35 | 281.48 |
| 1$^{st}$ Heat of Fusion (J/g) | 17.77 | 15.97 | 16.06 | 16.23 |
| 2$^{nd}$ Heat Melt Temp (° C.) | 282.00 | 278.44 | 279.13 | 279.80 |
| 2$^{nd}$ Heat of Fusion (J/g) | 17.29 | 14.96 | 15.02 | 16.34 |
| Recrystallization Temp (° C.) | 225.00 | 216.13 | 215.78 | 221.46 |
| Heat of Recrystallization (J/g) | 19.27 | 16.44 | 16.29 | 17.89 |
| Degree of Supercooling (J/g) | 57.00 | 62.31 | 63.35 | 58.34 |
| Degree of Crystallinity | 0.12 | 0.10 | — | — |

Figure 7A:
FIG. 7A-7D are scanning electron microscope images showing the morphology of the skin region of a polyphenylene sulfide/LCP blend (FIG. 7A), the skin region of a polyarylene sulfide/liquid crystal polymer alloy as described herein (FIG. 7B), a core region of a polyphenylene sulfide/LCP blend (FIG. 7C), and a core region of a polyarylene sulfide/liquid crystal polymer alloy as described herein (FIG. 7D).
Figure 7B:
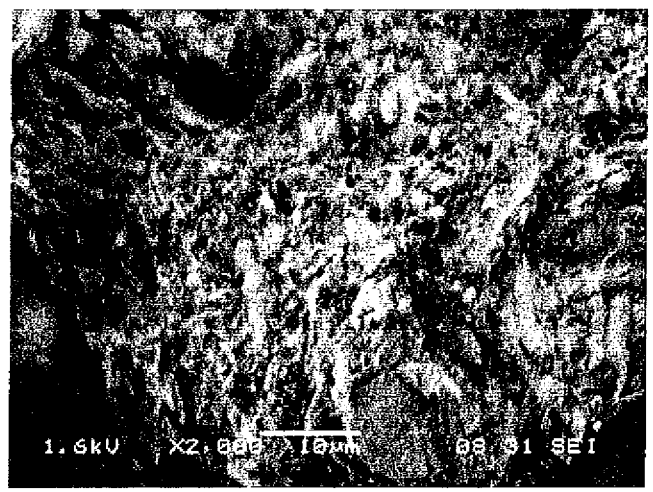
Figure 7C:
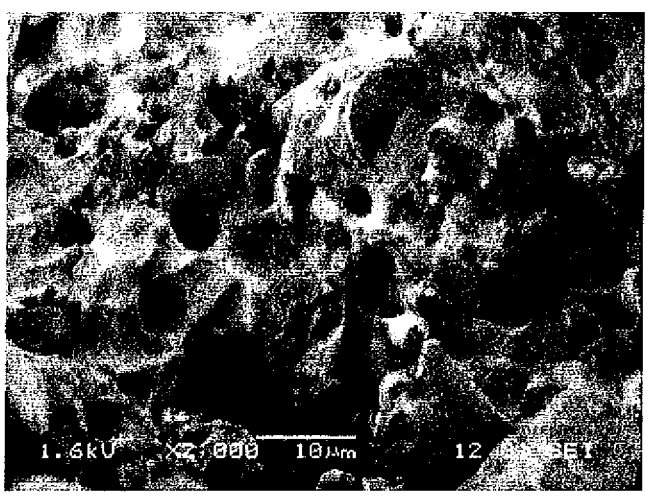
Figure 7D:

FIGS. 7A-7D present scanning electron microscope images of samples 001 and 002. Specifically, FIG. 7A shows the morphology of the skin region of sample 001, FIG. 7B shows the skin region of sample 002, FIG. 7C shows a core region of sample 001, and FIG. 7D shows a core region of sample 002. FIG. 7A illustrates that the liquid crystal polymer fibrils are fairly long in the uncompatiblized blend, with most of them pulling out from the polyphenylene sulfide matrix, which is an indication of poor interfacial bonding. On the other hand, FIG. 7B shows much smaller liquid crystal polymer fibrils in polyphenylene sulfide matrix. FIG. 7C and FIG. 7C demonstrate morphology in the core region of cross sections of fracture parts. FIG. 7C shows that the liquid crystal polymer phase exists as large spherical particles in the uncompatiblized blend. FIG. 7D shows much smaller domain size of liquid crystal polymer phase in the compatiblized polyphenylene sulfide/liquid crystal polymer alloy. The estimated liquid crystal polymer domain size in the polyphenylene sulfide/liquid crystal polymer physical blend of FIG. 7C is 5 to 20 microns, while it reduces to less than 1 micron in the compatiblized alloy of FIG. 7D. This indicates the reduction of interfacial tension between liquid crystal polymer and polyphenylene sulfide phases in melt state, and serves as a direct evidence of improved compatibility.

Figure 8:
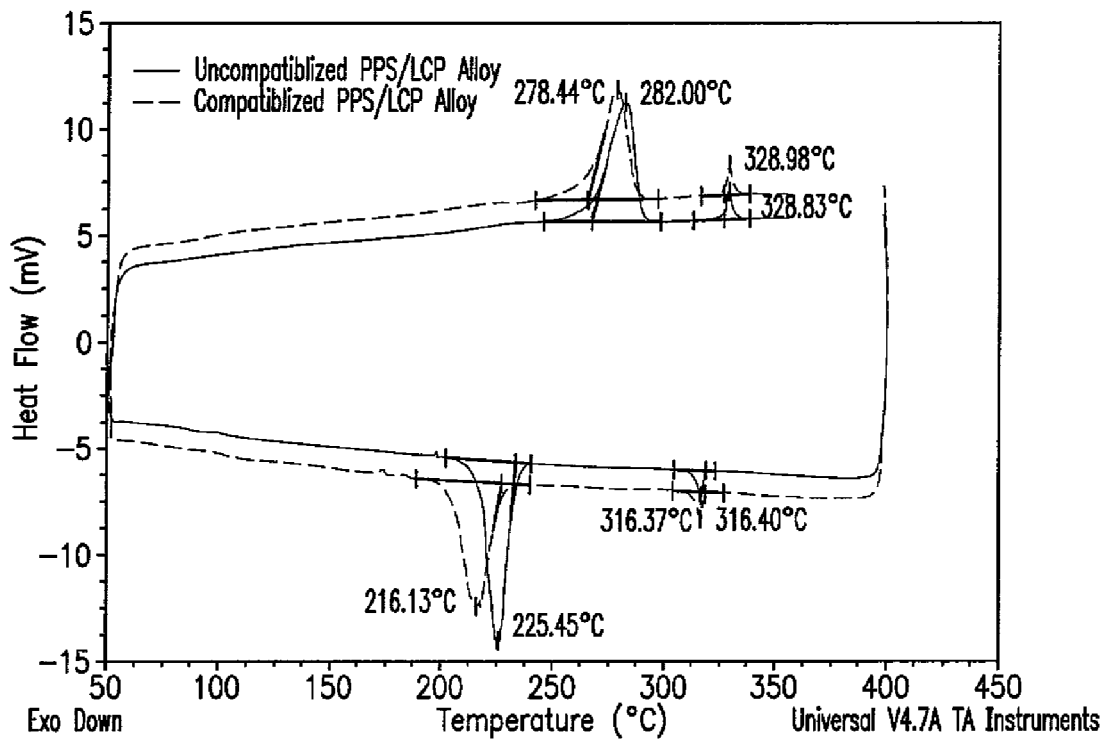
FIG. 8 is a differential scanning calorimetry (DSC) thermogram of a polyphenylene sulfide/LCP blend and a polyarylene sulfide/liquid crystal polymer alloy as described herein.

The differential scanning calorimeter thermograms of samples 001 and 002 are shown in FIG. 8, and other thermal properties are summarized in Table 3. As can be seen, while the melting transition of both the polyphenylene sulfide and liquid crystal polymer phases were not affected by compatiblization, the crystallization behavior did show a difference between the uncompatiblized blends and the compatiblized alloys. The crystallization temperature of the polyphenylene sulfide phase decreased from 225° C. to 216° C., and the heat of crystallization also dropped from 19.27 J/g to 16.44 J/g, which indicated retardation of polyphenylene sulfide crystallization process. The crystallization rate of polyphenylene sulfide phase was depressed in compatiblized polyphenylene sulfide/liquid crystal polymer blend as shown by an increase in the degree of super cooling. Such a decrease in the crystallization temperature and increase in the super cooling of polyphenylene sulfide phase are known to arise on compatiblization of incompatible blends. As shown by data in Table 3, the compatiblization also resulted in a decrease in crystallinity of polyphenylene sulfide phase, which have been observed in previous studies of compatiblized blends.

Flammability tests confirmed that both the physical blend materials (sample 001) and the compatiblized materials (sample 002) pass the V-0 rating at a thickness of 0.2 millimeters.

Figure 9:
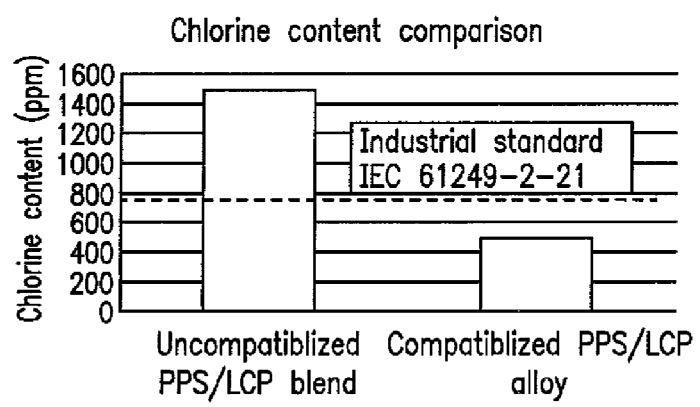
FIG. 9 illustrates the elemental analysis for chlorine content for a polyphenylene sulfide/LCP blend and a polyarylene sulfide/liquid crystal polymer alloy as described herein.

Chlorine content of samples 001 and 002 are illustrated in FIG. 9. As can be seen, the chlorine content of the blend of sample 001 was 1500 ppm, while that of the compatiblized material including the polyarylene sulfide/liquid crystal polymer alloy dropped to 490. Thus, this alloy is considered to be halogen free according to current industrial standards.

Example 3

Samples are formed in a single step extrusion process as described in Example 1. A phosphite stabilizer, Doverphos S680 available from Dover Chemical Company, is included in Sample Nos. 009 and 010. Formulations are as shown in Table 4, below:

TABLE 4

| Sample No. | 007 | 008 | 009 | 010 |
|---|---|---|---|---|
| 2,2'-Dithiodibenzoic acid | — | 0.40% | — | — |
| Phosphite Stabilizer | — | — | 0.5% | 0.5% |
| PETS | 0.3% | 0.3% | 0.3% | 0.3% |
| PTFE | 2.0% | 2.0% | 2.0% | 2.0% |
| Vectra ® E950iRX | 14.3% | 13.9% | 14.3% | 13.9% |
| Vectra ® E9500I, VD3003K20, BLACK | 5.0% | 5.0% | 5.0% | 5.0% |
| Glass fiber | 40.0% | 40.0% | 40.0% | 40.0% |
| Fortron ® 0214 | — | 38.4% | — | 37.9% |
| Fortron ® 0203B6 SF3001 | 38.4% | — | 37.9% | — |
| Total | 100% | 100% | 100% | 100% |

The extruded pellets are tested for ash content and melt viscosity, with results summarized in Table 5.

TABLE 5

| Sample No. | 007 | 008 | 009 | 010 |
|---|---|---|---|---|
| Ash % | 40.67 | 40.55 | 40.75 | 40.53 |
| Melt viscosity | 477.1 | 569.1 | 444 | 633 |

The samples are injection molded and tested for certain properties as summarized in Table 6.

TABLE 6

| Sample No. | 007 | 008 | 009 | 010 |
|---|---|---|---|---|
| Tensile Modulus (MPa) | 16758 | 16171 | 17026 | 17181 |
| Tensile Break Stress (MPa) | 142.20 | 147.50 | 131.91 | 137.86 |
| Tensile Break Strain (%) | 1.05 | 1.17 | 0.99 | 1.06 |
| Flexural Modulus (MPa) | 17305 | 16699 | 16628 | 16733 |
| Flexural Strength (MPa) | 213.47 | 210.90 | 202.00 | 207.00 |
| Flexural Strain (%) | 1.40 | 1.42 | 1.36 | 1.42 |

TABLE 6-continued

| Sample No. | 007 | 008 | 009 | 010 |
|---|---|---|---|---|
| Weldline Tensile Modulus (MPa) | 10350 | 10137 | 10799 | 11184 |
| Weldline Tensile Strength (MPa) | 22.46 | 30.48 | 33.39 | 37.99 |
| Weldline Tensile Strain (%) | 0.22 | 0.31 | 0.32 | 0.36 |
| Izod Unnotched (kJ/m$^2$) | 23 | 26 | 18.20 | 19.60 |
| Izod Notched (kJ/m$^2$) | 11 | 16 | 9.20 | 8.50 |
| DTUL (° C.) | 266.00 | 262.00 | 264.6 | 259.00 |
| Surface Glossiness | 55.86 | 78.30 | 57.74 | 84.82 |
| Mold Deposit % Loss of Shine | 62 | 51 | 11 | 17 |

The mechanical properties of both uncompatiblized (no reactively functionalized disulfide compound included) and compatiblized (include a reactively functionalized disulfide compound) polyphenylene sulfide/liquid crystal polymer alloy are comparable except for significant improvements in weld line strength and impact strength in the compatiblized alloys, which is understood to be a direct consequence of miscibility and improved stress transfer between the two phases.

Both Izod unnotched and notched impact resistance showed significant improvement upon compatiblization. In particular, notched Izod impact increases by 45%. The impact resistance is dependent on the dissipation capacity of the impact energy through the matrix and the delivery of internal stress from the continuous phase to the dispersed phase. Impact properties improvement is a good indication of enhanced interfacial bonding in the compatiblized PPS/LCP alloy. The weldline strength of the compatiblized PPS/LCP alloy also increases by 37% compared to PPS/LCP physical blend, which can be attributed to better miscibility and more efficient stress transfer at weldline in a compatiblized alloy.

Figure 10:
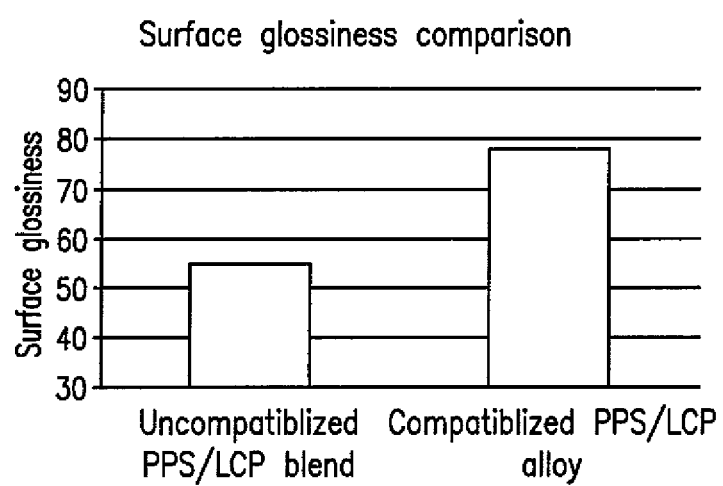
FIG. 10 illustrates a comparison of surface glossiness for a polyphenylene sulfide/LCP blend and a polyarylene sulfide/liquid crystal polymer alloy as described herein.

The compatiblized polyphenylene sulfide has improved surface properties as illustrated by the surface glossiness (FIG. 10). Due to the lower chlorine content, the compatiblized polyphenylene sulfide/liquid crystal polymer alloy may also reduce the mold deposit observed in uncompatiblized polyphenylene sulfide/liquid crystal polymer alloy.

Example 4

Glass fiber samples are digested in concentrated nitric acid followed by inductive coupled plasma/mass spectrometry analysis to determine the level of extractable cations between the following boron-containing and boron free glass samples:

Sample 11: Boron-containing E-glass from NEG;

Sample 12: Boron-containing E-glass from Vetrotex;

Sample 13: Boron-free E-glass from Owens Corning Vetrotex ("OCV"); and

Sample 14: Boron-free E-glass from OCV with same size as Sample 10.

The tables below compare the level of extractable cations between boron containing and boron free glass after nitric acid digestion.

TABLE 7

| Description: | Ag | Al | As | B | Ba | Be | Bi | Ca | Cd | Co | Cr |
|---|---|---|---|---|---|---|---|---|---|---|---|
| Sample 11: E glass from NEG | <1 | 5,060 | NA | 1,980 | 12 | <1 | <1 | 1,339 | <1 | <1 | <1 |
| Sample 12: E glass from Vetrotex | <1 | 7,466 | NA | 1,628 | 177 | <1 | <1 | 2,063 | <1 | <1 | <1 |
| Sample 13: Boron free E glass from OCV | <1 | 179 | NA | 15 | <1 | <1 | <1 | 66 | <1 | <1 | <1 |
| Sample 14: Boron free E glass from OCV | <1 | 174 | NA | 18 | <1 | <1 | <1 | 59 | <1 | <1 | <1 |

TABLE 8

| Description: | Cs | Cu | Fe | Ga | In | K | Li | Mg | Mn | Na |
|---|---|---|---|---|---|---|---|---|---|---|
| Sample 11: E glass from NEG | <1 | <1 | 98 | 9 | <1 | 74 | <1 | 985 | <1 | 874 |
| Sample 12: E glass from Vetrotex | <1 | <1 | 96 | 22 | <1 | 92 | 3 | 253 | 4 | 637 |
| Sample 13: Boron free E glass from OCV | <1 | <1 | <1 | 6 | <1 | 9 | <1 | 46 | <1 | 17 |
| Sample 14: Boron free E glass from OCV | <1 | <1 | <1 | 6 | <1 | 12 | <1 | 43 | <1 | 81 |

TABLE 9

| Description: | Ni | Pb | Rb | Se | Sr | Tl | U | V | Ti | Zn | Total Amount of All Cations (ppm) |
|---|---|---|---|---|---|---|---|---|---|---|---|
| Sample 11: E glass from NEG | <1 | <1 | <1 | <1 | <1 | <1 | <1 | <1 | NA | <1 | 10,430 |
| Sample 12: E glass from Vetrotex | <1 | <1 | <1 | <1 | 65 | <1 | <1 | <1 | NA | <1 | 12,507 |
| Sample 13: Boron free E glass from OCV | <1 | <1 | <1 | <1 | <1 | <1 | <1 | <1 | NA | <1 | 339 |
| Sample 14: Boron free E glass from OCV | <1 | <1 | <1 | <1 | <1 | <1 | <1 | <1 | NA | <1 | 393 |

As indicated in Tables 7-9, E-glass fibers that are free of boron (Samples 13 and 14) have a much lower amount of total cations than typical boron-containing E-glass.

While certain representative embodiments and details have been shown for the purpose of illustrating the subject invention, it will be apparent to those skilled in this art that various changes and modifications may be made therein without departing from the scope of the subject invention.

What is claimed is:

1. A polyarylene sulfide/liquid crystal polymer alloy comprising:
   a polyarylene sulfide;
   a liquid crystal polymer;
   a compatibilizer, wherein the compatibilizer is a copolymer formed in situ in conjunction with the formation of the polyarylene sulfide/liquid crystal polymer alloy, the compatibilizer including a first unit of the polyarylene sulfide and a second unit of the liquid crystal polymer copolymerized with one another; and
   a fibrous filler.

2. The polyarylene sulfide/liquid crystal polymer alloy according to claim 1, wherein the polyarylene sulfide/liquid crystal polymer alloy includes from about 5 wt. % to about 90 wt. % of the polyarylene sulfide by weight of the polyarylene sulfide/liquid crystal polymer alloy and from about 5 wt. % to about 90 wt. % of the liquid crystal polymer by weight of the polyarylene sulfide/liquid crystal polymer alloy.

3. The polyarylene sulfide/liquid crystal polymer alloy according to claim 1, wherein the ratio of liquid crystal polymer to polyarylene sulfide in the polyarylene sulfide/liquid crystal polymer alloy is from about 5:1 to about 1:5.

4. The polyarylene sulfide/liquid crystal polymer alloy according to claim 1, wherein the polyarylene sulfide is a homopolymer or a copolymer.

5. The polyarylene sulfide/liquid crystal polymer alloy according to claim 1, wherein the polyarylene sulfide has a melt viscosity of greater than about 1500 poise as determined in accordance with ISO Test No. 11443 at a shear rate of 1200 s$^{-1}$ and at a temperature of 310° C., and the polyarylene sulfide/liquid crystal polymer alloy has a chlorine content of less than about 1000 parts per million.

6. The polyarylene sulfide/liquid crystal polymer alloy according to claim 1, the polyarylene sulfide/liquid crystal polymer alloy including a polyarylene sulfide phase having a recrystallization temperature of less than about 225° C.

7. The composition according to claim 1, the composition having a melt viscosity of less than about 1500 poise as determined in accordance with ISO Test No. 11443 at a shear rate of 1200 s$^{-1}$ and at a temperature of 310° C.

8. The composition according to claim 1, the composition having a weldline tensile strength of greater than about 30 MPa as determined in accordance with ISO Test No. 527 at a testing temperature of 23° C. and at a testing speed of 5 mm/min.

9. The composition according to claim 1, the composition having a surface glossiness of greater than about 60.

10. The composition according to claim 1, the composition having an Izod unnotched impact strength of greater than about 19 kJ/m$^2$ as determined according to ISO Test No. 180/1 U as measured at 23° C.

11. The composition according to claim 1, wherein the fibrous filler includes glass fibers that are essentially free of boron.

12. A printer cartridge comprising the composition of claim 11.

13. A printer part comprising the composition of claim 11.

14. An electrical connector comprising the polyarylene sulfide/liquid crystal polymer alloy of claim 1.

15. An overmolding comprising the polyarylene sulfide/liquid crystal polymer alloy of claim 1.

16. A computer comprising the polyarylene sulfide/liquid crystal polymer alloy of claim 1.

17. A method of forming a polyarylene sulfide/liquid crystal polymer alloy comprising:
   melt processing a polyarylene sulfide with a reactively functionalized disulfide compound comprising reactive moieties and a fibrous filler, the reactively functionalized disulfide compound being present in a stoichiometric amount to react with only a portion of the polyarylene sulfide to form poiyarylene sulfide endcapped with the reactive moieties of the reactively functionalized disulfide compound;

combining a liquid crystal polymer with the polyarylene sulfide and the fibrous filler;

forming a polyarylene sulfide/liquid crystal polymer copolymer that is a compatibilizer in the polyarylene sulfide/liquid crystal polymer alloy, the polyarylene sulfide/liquid crystal polymer alloy including the polyarylene sulfide that does not react with the reactively functionalized disulfide compound, the liquid crystal polymer, and the compatibilizer.

18. The method according to claim 17, wherein the liquid crystal polymer is combined with the polyarylene sulfide in conjunction with melt processing the polyarylene sulfide with the reactively functionalized disulfide compound.

19. The method according to claim 17, wherein the liquid crystal polymer is combined with the polyarylene sulfide following melt processing the polyarylene sulfide with the reactively functionalized disulfide compound.

20. The method according to claim 17, further comprising forming the polyarylene sulfide.

21. The method according to claim 17, wherein the polyarylene sulfide has a melt viscosity of greater than about 1500 poise as determined in accordance with ISO Test No. 11443 at a shear rate of 1200 s$^{-1}$ and at a temperature of 310° C.

22. The method according to claim 17, wherein the reactive moieties of the reactively functionalized disulfide compound are selected from the group consisting of hydroxyl moieties, carboxyl moieties, amino moieties, and nitro moieties.

23. The method according to claim 17, wherein the reactively functionalized disulfide compound is melt processed with the polyarylene sulfide in an amount of from about 0.1 wt. % to about 3 wt. % by weight of the polyarylene sulfide/liquid crystal polymer alloy.

24. The method according to claim 17, further comprising forming the liquid crystal polymer.

25. The composition of claim 1, wherein the composition includes a phosphite stabilizer, an organic phosphate, or a combination thereof.

26. The composition of claim 1, wherein the composition includes an organosilane coupling agent.

27. The composition of claim 1, wherein the composition includes a mineral filler.

28. The composition of claim 1, wherein the composition includes an impact modifier.

* * * * *